United States Patent [19]

Melcher

[11] Patent Number: 4,922,110
[45] Date of Patent: May 1, 1990

[54] DOCUMENT COUNTER AND ENDORSER

[75] Inventor: Richard A. Melcher, Croydon, Pa.

[73] Assignee: Brandt, Inc., Bensalem, Pa.

[21] Appl. No.: 182,482

[22] Filed: Apr. 15, 1988

[51] Int. Cl.$^5$ ............................ G06K 5/00; G01N 9/04
[52] U.S. Cl. ................................. 250/556; 250/223 R
[58] Field of Search ................... 250/556, 223 R, 572, 250/563, 562; 356/71; 209/534

[56] References Cited

U.S. PATENT DOCUMENTS

| | | | |
|---|---|---|---|
| 3,870,868 | 9/1975 | Jones | 235/92 SB |
| 3,938,663 | 2/1976 | Carnes et al. | 250/556 |
| 4,237,378 | 12/1980 | Jones | 250/223 R |
| 4,319,137 | 3/1982 | Nakamura et al. | 250/556 |
| 4,381,447 | 4/1983 | Horvath et al. | 250/223 R |
| 4,592,090 | 5/1986 | Curl et al. | 250/556 |
| 4,605,926 | 8/1986 | Onishi et al. | 340/825.3 |
| 4,608,704 | 8/1986 | Sherman et al. | 377/8 |
| 4,709,914 | 12/1987 | Taylor | 250/223 R |
| 4,723,072 | 2/1988 | Naruse | 250/556 |
| 4,737,627 | 4/1988 | Hughes et al. | 250/223 R |
| 4,761,002 | 8/1988 | Reed et al. | 271/111 |

OTHER PUBLICATIONS

Lancaster, *TTL Cookbook*, pp. 28-29 (1974).

Primary Examiner—David C. Nelms
Assistant Examiner—Michael Messina
Attorney, Agent, or Firm—Shenier & O'Connor

[57] ABSTRACT

Documents such as checks, food stamps or the like are successively advanced along a path between a transversely spaced pair of light-emitting diodes (LEDs) and a correspondingly spaced pair of photodiodes to generate signals for counting and misfeed detection. Various error detectors detect sheet misfeed by integrating signals derived from one or more sheet sensors and comparing the integrated signal with reference signals that vary with the drive speed. A doubles detector generates a signal indicating a double feed if the integral of an analog optical density while below a predetermined threshold lies beyond a predetermined limit. A potentiometer permits adjustment of the threshold optical density at which the integrator becomes operative. An LED coupled to the output of a spare amplifier on the chain note board permits detection of the momentary presence of an output signal from a particular error detector.

17 Claims, 11 Drawing Sheets

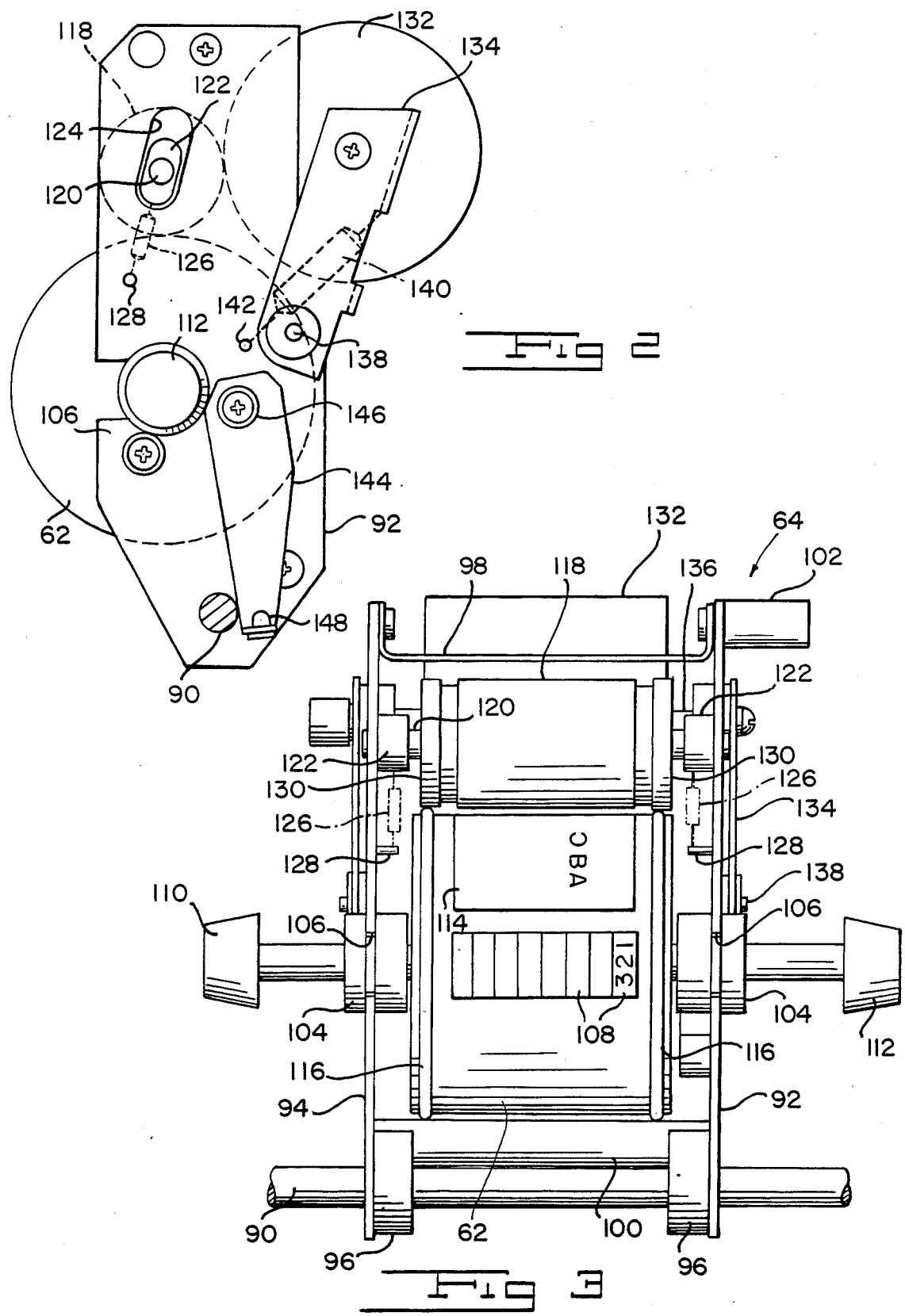

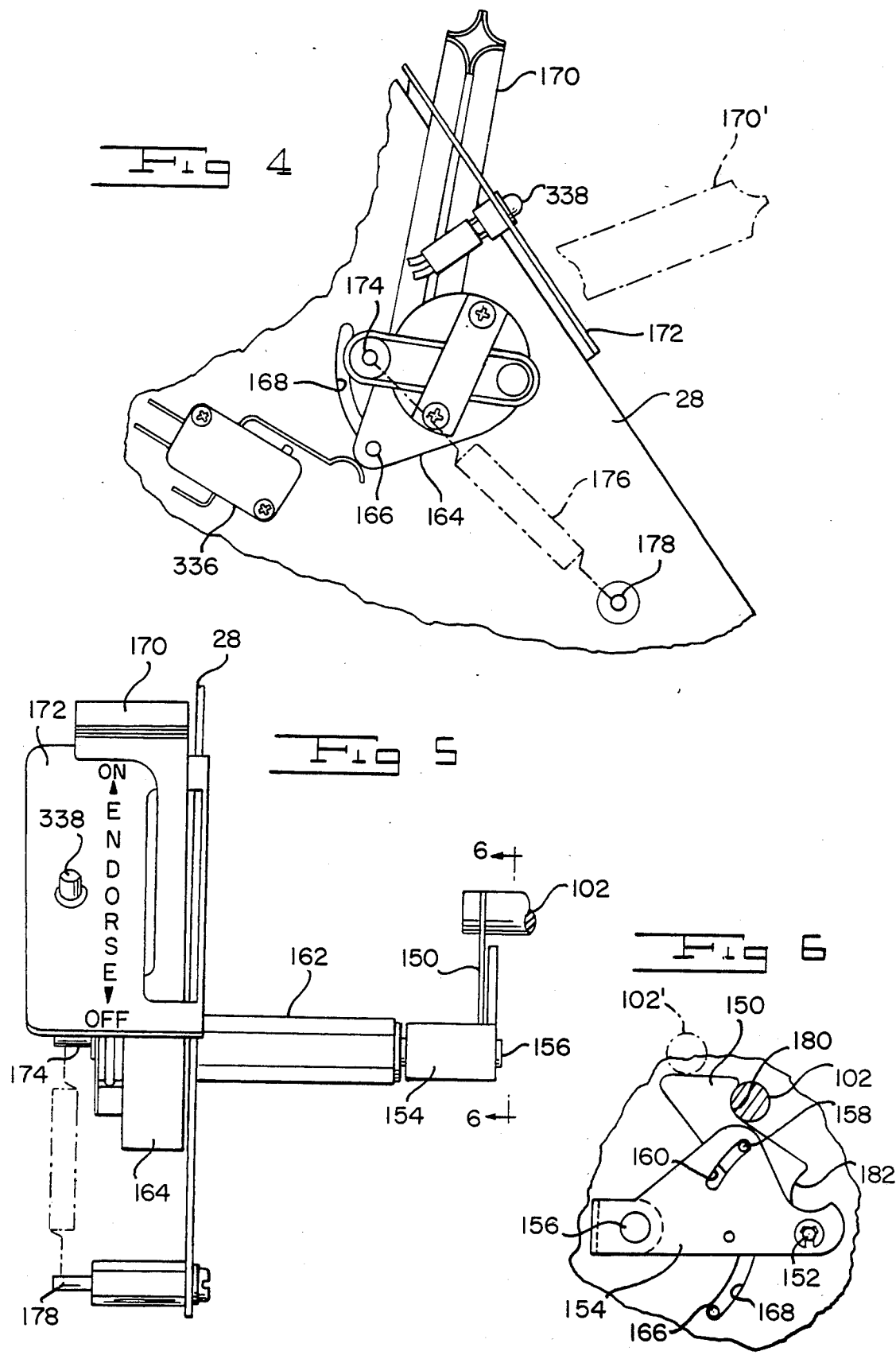

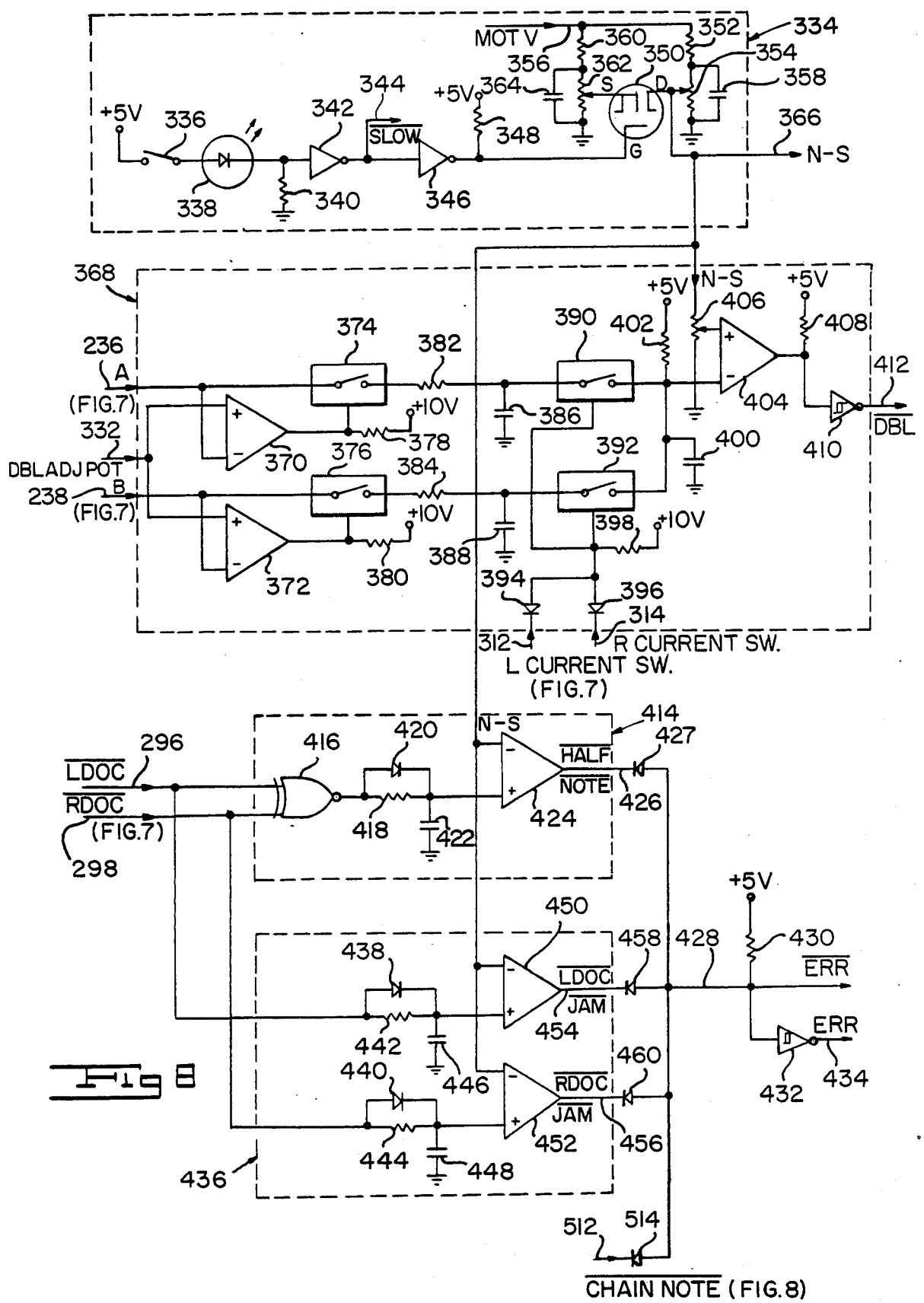

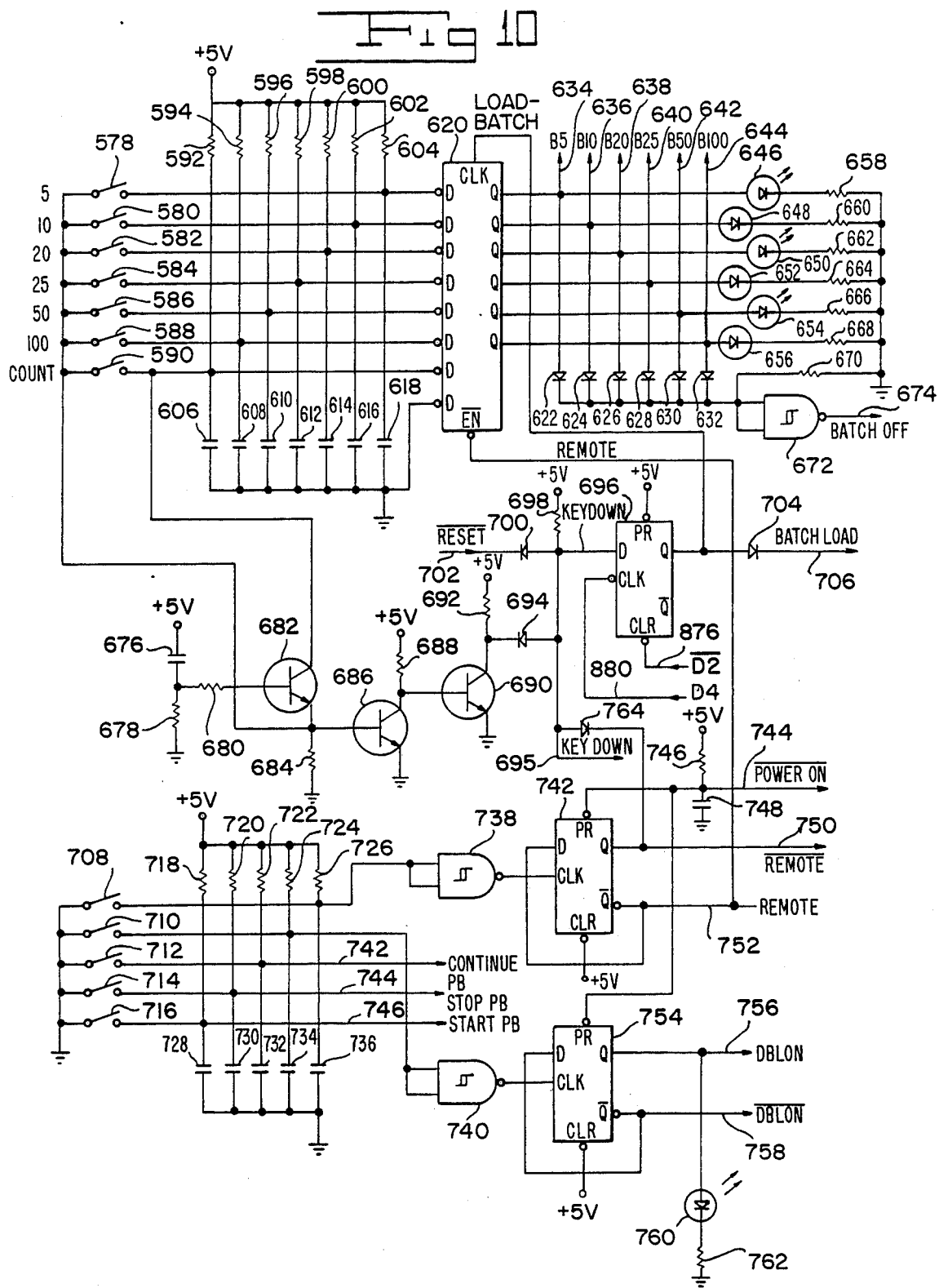

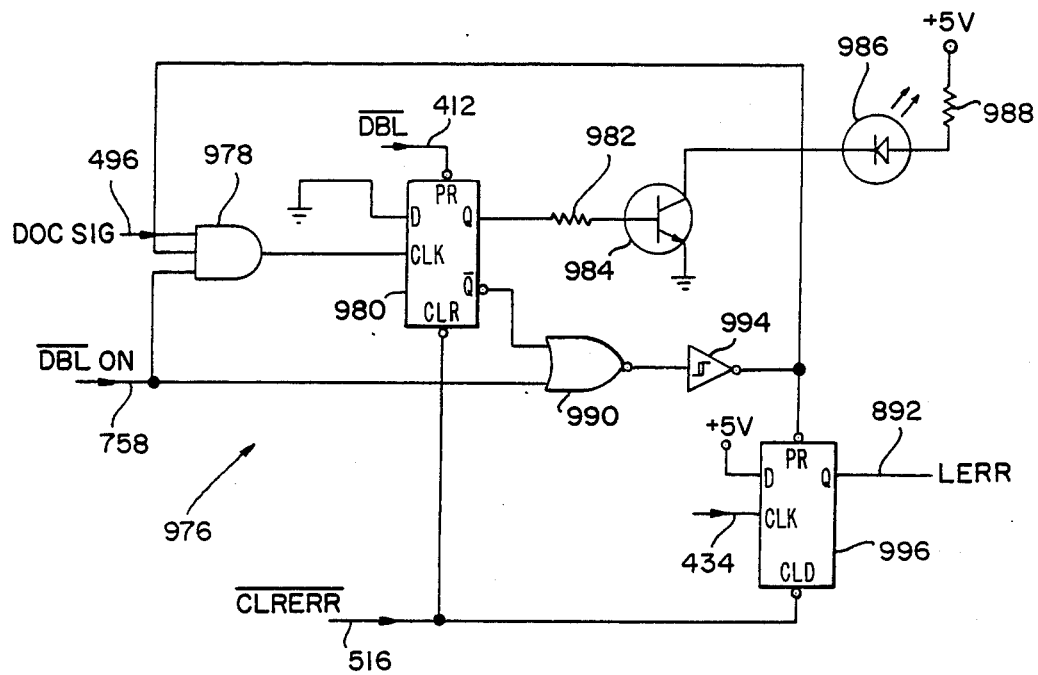
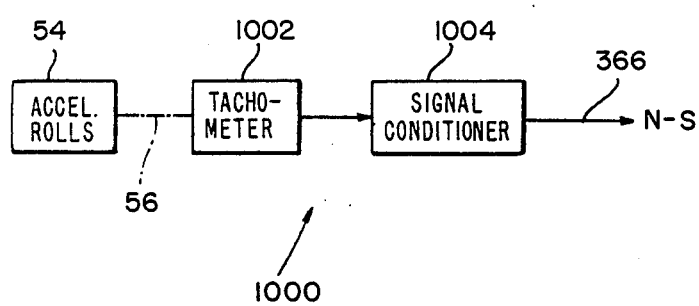

DOCUMENT COUNTER AND ENDORSER

FIELD OF THE INVENTION

This invention relates to apparatus for counting and batching documents such as currency, checks, food stamps and the like, and for endorsing such documents other than currency.

BACKGROUND OF THE INVENTION

Document counters and batchers are well known in the art, being disclosed in such prior patents as Sherman et al U.S. Pat. No. 4,608,704 and DiBlasio U.S. Pat. No. 4,474,365. Electronic control systems for such apparatus are also well known in the art as exemplified by such patents as Jones U.S. Pat. Nos. 4,237,378, 4,015,110 and 3,870,868, as well as the above-identified Sherman et al U.S. Pat. No. 4,608,704.

Various "doubles detection" circuits have been used in such systems to detect the simultaneous multiple feeding of documents. One of the problems that has avoided satisfactory solution in the past is that of distinguishing a single $20 bill that has become dirty through use from a pair of superimposed clean $5 bills. The superimposed $5 bills, if scanned vertically, contain high-density printed matter over a relatively small portion of the scanning line, but are otherwise of low optical density. The single dirty $20 bill, on the other hand, has an optical density whose average approximates that of the superimposed $5 bills, but which is more uniform.

In the systems disclosed in U.S. Pat. Nos. 4,237,378 and 4,608,704, doubles signals are generated if the outputs of path sensors indicate greater than normal optical density for longer than a predetermined period. Such systems are sensitive only to whether the optical density signal is above or below a certain threshold at a given instant, and beyond this are insensitive to the particular signal level. As a result, such systems are susceptible to reading, as doubles, singles whose optical density exceeds the normal level only very slightly for a sufficient period of time.

Other systems, such as shown in Onishi et al U.S. Pat. No. 4,605,926, simply integrate the optical density level and generate an error signal if the integration result lies beyond permissible limits. Although such systems better distinguish between optical density signals having different degrees of peakiness, they cannot differentiate between signals of the same average optical density, such as the signals for the single dirty $20 bill and the superimposed clean $5 bills referred to above.

Furthermore, both types of systems integrate with respect to time, and hence are undesirably sensitive to momentary fluctuations in drive speed.

Other shortcomings of prior-art control systems involve the path sensors themselves. Generally these sensors comprise a light-emitting diode (LED) on one side of the sheet path and a suitable photodectector such as a photodiode or phototransistor receptive to light from the LED. Greater sensitivity in such systems is generally achieved by operating the LEDs at a relatively high output level. Such LED output levels that maximize sensitivity, however, also greatly shorten the useful lifetime of the LEDs. Certain of the systems identified above incorporate the LED and the photodetector into a feedback circuit in which the detector output is maintained at a relatively constant level, thereby reducing the LED output level when no documents are present. In certain applications such as measuring optical density, however, it may be desirable for the light incident on the document to remain constant during the scanning period.

Still other problems involve document handlers containing endorser assemblies, which are well known in the art as exemplified by Loftus et al U.S. Pat. No. 4,054,090 and McInerny U.S. Pat. No. 4,004,506. A particular shortcoming of apparatus of this type is that the speed at which the apparatus reliably operates is appreciably lower with the endorser assembly engaged than with the endorser assembly disengaged Simply limiting the document speed to a speed compatible with endorser operation, however, will unnecessarily limit the efficiency of the apparatus when the endorser assembly is disengaged.

SUMMARY OF THE INVENTION

One object of my invention is to provide a document-handling apparatus that is capable of endorsing documents.

Another object of my invention is to provide a document-handling apparatus that operates reliably in the endorser mode.

Still another object of my invention is to provide a document-handling apparatus that operates at maximum efficiency when the endorser is not in operation.

Another object of my invention is to provide a document-handling apparatus that distinguishes between singly fed and doubly fed documents of the same average optical density.

Still another object of my invention is to provide a document-handling apparatus that distinguishes between spurious optical-density peaks of singly fed documents and peaks characteristic of doubly fed documents.

A further object of my invention is to provide a document-handling apparatus that maximizes the use of sensor information in detecting misfeeds.

An additional object of my invention is to provide a document-handling apparatus that does not require frequent replacement of components such as light-emitting diodes and the like.

A still further object of my invention is to provide a document-handling apparatus that is operable over a wide range of ambient conditions.

Another object of my invention is to provide a document-handling apparatus that is insensitive to changes in transport speed.

An additional object of my invention is to provide a document-handling apparatus that is easy to service.

A further object of my invention is to provide a document-handling apparatus that is simple and inexpensive.

Other and further objects of my invention will be apparent from the following description.

In one aspect, my invention contemplates apparatus in which the speed at which sheets are advanced along a path is controlled in accordance with whether a printing member such as an endorser roller is disposed in an operative position adjacent to the path or an inoperative position relatively remote from the path. More particularly, the apparatus is driven at a lower speed when the endorser member is engaged and at a higher speed when the endorser member is disengaged. By automatically adjusting the speed of operation in accordance with the position of the endorser member, I ensure reliable operation in the endorser mode while at the same time allowing for maximum efficiency of operation in the normal, non-endorser mode. Preferably, a suitable indicator such as an LED is also actuated in accordance with the position of the endorser member.

In another aspect, my invention contemplates apparatus in which a sheet signal derived from a path sensor is integrated and compared with a reference signal generated in accordance with the speed of the sheet advance. By varying the reference signal in this manner, I minimize performance irregularities due to fluctuations in operating speed.

Yet another aspect of my invention contemplates apparatus in which a signal representing the optical density of a sheet portion passing a predetermined location along the sheet path is coupled to an integrator whenever the indicated optical density exceeds a predetermined threshold of greater than average optical density. Preferably the threshold signal is derived from a stored signal representing the value of the optical density signal in the absence of a sheet. An error signal indicating a double feed is generated in response to the comparison of the integrator output with a reference signal that is preferably varied in accordance with drive speed.

A further aspect of my invention contemplates apparatus in which a light source is operated at the higher of two output levels over a first range of intensities of light incident on a photodetector receptive to light from the source and is operated at the lower of the two levels over a second range of incident light intensities higher than the first range. This expedient significantly extends the life of the LED light sources. At the same time, however, it does not reduce the effective sensitivity of the photodetector. Preferably, the first range of intensities includes all incident intensities resulting from the interposition of sheets likely to be encountered in normal operation.

Still another aspect of our invention contemplates apparatus in which selectively coupled means are provided for observably indicating the presence of one or more error signals generated in response to a sheet signal derived from a sensor disposed along the sheet path. Preferably, the indicating means comprises an LED driven by one unit of a multiple-unit integrated circuit, the other units of which are used in one of the error detectors. By selectively coupling the driver input to appropriate test points in the error detection circuit, one can check for the existence of various error signals without using additional integrated circuits and without requiring separate LEDs for the respective signals.

Yet another aspect of my invention contemplates apparatus in which the internal oscillator of a counter which is incremented in response to the movement of a sheet along a path is coupled to an audible alarm in response to the detection of a misfeed. Preferably the counter is a four-digit programmable up/down counter whose count is used for both batch control and digital display. By using the internal oscillator of an existing component in this manner, I avoid the necessity of providing a separate oscillator for the audible alarm.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 2 is an enlarged left side elevation of the endorser module of the apparatus of FIG. 1, shown in a disengaged, upright position.

FIG. 3 is a rear elevation of the endorser module shown in FIG. 2.

FIG. 4 is an enlarged left side elevation of the endorser lever assembly of the apparatus shown in FIG. 1.

FIG. 6 is a fragmentary section of a portion of the endorser lever assembly of FIG. 4, taken along line 6—6 of FIG. 5.

FIG. 8 is a schematic diagram of the endorser sensor, doubles detection, half-note detection and jam detection circuits of the apparatus shown in FIG. 1.

FIG. 9 is a schematic diagram of the chain note detection circuit of the apparatus of FIG. 1.

FIG. 10 is a schematic diagram of a portion of the display circuit of the apparatus shown in FIG. 1.

FIG. 14 is a schematic diagram of the error condition circuit of the apparatus shown in FIG. 1.

FIG. 15 is a schematic diagram of an alternative means of generating a comparison signal for the error detection circuits shown in FIG. 8.

DESCRIPTION OF THE PREFERRED EMBODIMENT

Figure 1:
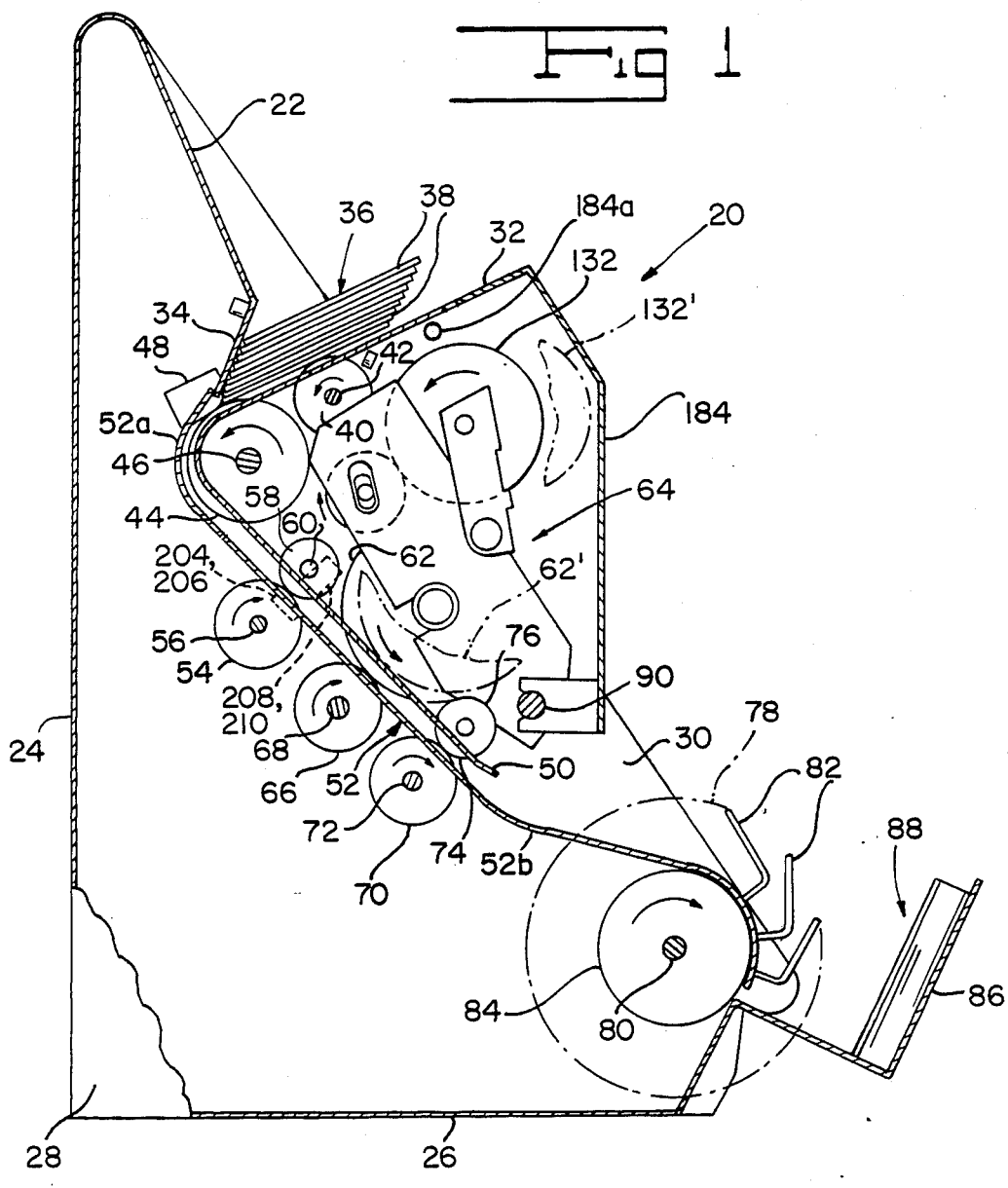
FIG. 1 is a left side elevation of an apparatus incorporating our invention, with parts shown in section or broken away.

Referring first to FIG. 1, an endorser incorporating our invention, indicated generally by the reference numeral 20, includes a housing having an upper front wall 22, a back wall 24 and a bottom wall 26 extending between left and right sidewalls 28 and 30. An input tray 32 having an upwardly inclined front end supports a stack 36 of sheets 38, which may comprise such documents as currency, checks, food stamps or the like. Sheets 38 are placed upon input tray 32 with their lengths extending between sidewalls 28 and 30 and with the sides to be endorsed facing downwardly, if the endorser mode is used. Input tray 32 biases sheets 38 in the stack 36 rearwardly against a downwardly and rearwardly extending portion 34 of front wall 22 cooperating with tray 32 to form a throat through which the sheets are fed.

A shaft 42 extending between sidewalls 28 and 30 beneath input tray 32 supports a pair of friction picker rolls 40, which are mounted eccentrically on shaft 42 at spaced locations therealong. Shaft 42 is driven counterclockwise as viewed in FIG. 1 by suitable means described below. The eccentric mounting of rolls 40 on shaft 42 is such that, for a portion of each revolution of shaft 42, rolls 40 move upwardly through slots (not shown) formed in input tray 32 to urge the lowermost sheet into the throat formed by the input tray and wall portion 34. There, a pair of transversely spaced feed rolls 44 supported by a shaft 46 extending between sidewalls 28 and 30 frictionally urge the sheet 38 along a feed path defined by an upper guide 50 and a lower guide 52 comprising portions 52a and 52b. As shown in FIG. 1, the feed path defined by guides 50 and 52 extends downwardly and toward the front of the apparatus 20, while feed rolls 44 are disposed forwardly of the feed path beneath input tray 32. Respective stripper shoes 48 disposed oppositely from feed rolls 44 at the entrance to the feed path inhibit the inadvertent feeding of two or more sheets 38 simultaneously from the input tray 32. Preferably each of shoes 48 comprises a material having a coefficient of friction with paper that is greater than that between two adjacent sheets of paper, but less than the coefficient of friction between the paper and the feed rolls 44. Preferably, feed rolls 44 are knurled to improve their grip upon sheets 38.

Upon clearing the feed rolls 44, the sheet 38 that has been fed from the stack 36 passes between a pair of transversely spaced acceleration rolls 54 supported by a shaft 56 beneath lower guide 52 and a pair of transversely spaced idler rolls 58, each of which is supported by a yoked shaft 60 and is urged against the corresponding acceleration roll 54. Acceleration rolls 54 are driven at a linear velocity greater than that of feed rolls 44 in order to accelerate the sheet 38 rapidly, thereby to create gaps between successively fed sheets.

As the sheet 38 progresses further along the feed path between guides 50 and 52, it passes between an endorser roll 62, disposed on the upper side of the feed path toward the front of apparatus 20, and a platen roll 66 supported by a shaft 68 beneath the lower guide 52. Endorser roll 62 is carried by an endorser module indicated generally by the reference numeral 64 which is movable between an operative position shown in solid lines in FIG. 1 and an inoperative position in which the endorser roll 62 occupies a position 62' spaced from the feed path. Following its movement between the endorser roll 62 and the platen roll 66, the sheet 38 passes between a second pair of acceleration rolls 70, disposed at spaced locations along a shaft 72 beneath lower guide 52, and a pair of idler rolls 74, each of which is supported by a yoked shaft 76 and is biased against the corresponding acceleration roll 70.

Lower acceleration rolls 70 advance the sheet 38 to a pair of transversely spaced stacker wheels 78 carried by a shaft 80. Each of stacker sheels 78 comprises a plurality of fingers 82 extending radially outwardly and counterclockwise as viewed in FIG. 1. Fingers 82 form compartments into which the sheets 38 are fed for inversion prior to their delivery to a stack 88 formed in an output tray 86 disposed in front of stacker wheels 78. As a result of the inversion by stacker wheels 78, sheets 38 are deposited into stack 88 in the same order as in the input stack 36, with the downwardly facing side in stack 36 also facing downwardly in stack 88.

Referring now also to FIGS. 2 and 3, endorser module 64 is pivotally supported by a rod 90 extending transversely between sidewalls 28 and 30. Endorser module 64 comprises left and right side plates 92 and 94.

Respective collars 96 fixed on shaft 90 position endorser module 64 transversely. Side plates 92 and 94 extend generally vertically, and are joined at their upper ends by a spacer bracket 98 and at their lower ends by a spacer rod 100. Left side plate 92 carries an actuator pin 102 at its upper end, which links module 64 to an endorser control lever to be described. Respective bearings 104 associated with endorser roll 62 are received in slots 106 formed in side plates 92 and 94 for rotatably mounting the endorser roll relative to module 64. Referring to FIG. 3, endorser roll 62 contains a plurality of axially spaced print wheels 108, by means of which variable information, typically numerical information such as dates or the like, may be endorsed on sheets 38 fed from stack 36.

A first knob 110 coaxial with endorser roll 62 permits adjustment of the print wheels 108 so that the appropriate numerical information is printed on the sheets 38. A coaxial reset knob 112 disposed on the other side of endorser roll 62 from adjustment knob 110 allows the wheels 108 to be reset. Endorser roll 62 also carries a rubber pad 114 having raised portions for printing such information as the name of the bank or other endorsing authority. Endorser roll 62 carries a pair of O-rings 116 at its ends, which engage platen roll 66 when the endorser roll 62 is engaged to receive motion therefrom. Endorser module 64 also includes a transfer roll 118 having a shaft 120 received by bearings 122 movable within respective slots 124 formed in side plates 92 and 94. Respective tension springs 126 extending between bearings 122 and posts 128 carried by side plates 92 and 94 urge friction portions 130 at the ends of transfer roll 118 into engagement with the O-rings 116 of endorser roll 62. Referring particularly to FIG. 3, the inboard portion of transfer roll 118 is generally spaced from the adjacent portions of endorser roll 62, but is sufficiently close to the endorser roll to transfer ink to the raised portions of wheels 108 and pad 114. Transfer roll 118 in turn engages an inking roll 132 mounted on a shaft 136 rotatably supported at the end of a pivot member 134. Respective pivots 138 carried by side plates 92 and 94 rotatably support pivot member 134 at the end remote from inking roll 132. Respective tension springs 140 (not shown in FIG. 3) disposed between pivot member 134 and posts 142 carried by side plates 92 and 94 urge inking roll counterclockwise about the axis of pivots 138, as viewed in FIG. 2, to urge inking roll 132 into engagement with transfer roll 118.

Figure 5:
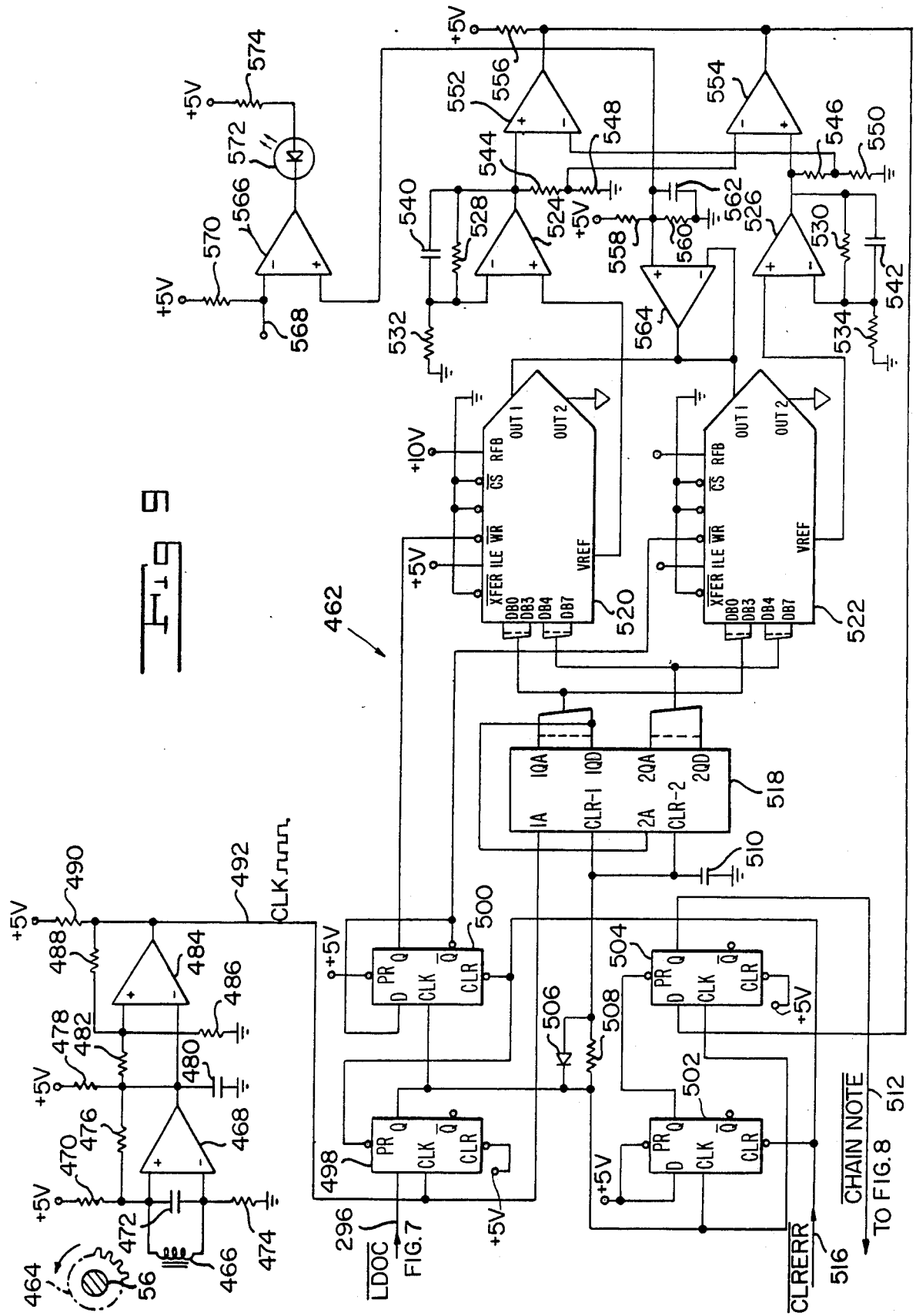
FIG. 5 is a fragmentary front elevation of the endorser lever assembly shown in FIG. 4.

Referring now to FIGS. 4 to 6, actuator pin 102, and hence endorser module 64, is maintained in an operative position with endorser roll 62 in the feed path by a hook 150 (FIG. 6), one recess 180 of which receives actuator pin 102 in the operative position of endorser module 64. Hook 150 in turn rotates about a pivot 152 carried at the end of a bracket 154 remote from a control shaft 156 upon which bracket 154 is mounted for rotation therewith. Referring again to FIG. 6, a pin 158 carried by hook 150 extends through an arcuate slot 160 formed in bracket 154 to limit the extent of movement of hook 150 relative to bracket 154. Suitable means (not shown) resiliently bias hook 150 clockwise as viewed in FIG. 6 about the axis of pivot 152 to ensure that actuator pin 201 remains seated in recess 180.

Control shaft 156, rotatably received by a sleeve 162 carried inboard of left sidewall 28, extends outwardly of side wall 28 to receive an eccentric cam 164. A pin 166 carried by member 164 extends inwardly through a slot 168 formed in left sidewall 28 to limit the extent of rotation of member 164, and hence control shaft 156, relative to the sidewall. A tension spring 176 extends between a pin 174 carried by member 164 and a pin 178 carried by sidewall 28. Pins 174 and 178 are so located relative to pin 166 and slot 168 that, as the pin 168 moves along slot 168 upon rotation of member 164, spring 176 goes "over center" so as to maintain pin 166 at either end of slot 168. An upwardly extending lever arm 170 carried by member 164 extends through an opening in a bracket 172 carried by sidewall 28. As shown in FIG. 5, bracket 172 bears notations indicating the state of the endorser.

Whenever the endorser module 64 is to be in an operative position, lever arm 170 is set in the upper position, shown in solid lines in FIG. 4, adjacent to the "on" indication on bracket 172. In this position of lever arm 170, control bracket 154 and hook 150 are in the positions shown in FIG. 6. To disengage the endorser module 64, lever arm 170 is moved downwardly to the position 170' shown in phantom lines in FIG. 4. This causes control bracket 154, and hence hook 150, to rotate counterclockwise as viewed in FIG. 6 to a position in which recess 180 releases actuator pin 102 to allow the pin to fall into a second recess 182 formed in hook 150 adjacent to pivot 152. Since the angular movement of control bracket 154 reproduces the 60° angular movement of lever arm 170 (FIG. 4), actuator pin 102 is now in position 102' shown in FIG. 6. In this position of actuator pin 102, endorser module 64 is shifted to a position in which endorser roll 62 and inking roll 132 occupy the phantom line positions 62' and 132' shown in FIG. 1. To return the endorser module 64 to the operative position shown in solid lines in FIG. 1, the user simply returns lever arm 170 to the upper position shown in FIG. 4.

The endorser module 64 may be freed entirely from control bracket 154 and hook 150, for servicing and the like, by pivoting hook 150 counterclockwise as viewed in FIG. 6 to release actuator pin 102. A front panel portion 184 (FIG. 1) mounted on a pivot 184a adjacent to input tray 32 may be swing upwardly to permit access to the endorser module 64. Referring to FIG. 2, a stop lever 144 pivotally secured to side plate 92 by a screw 146 carries a bumper tip 148 at the end remote from screw 146. Stop lever 144 rests upon a portion (not shown) of the apparatus 20 to support the endorser module 64 in a generally horizontal position for servicing.

Referring to FIG. 1, a pair of light-emitting diodes (LEDs) 208 and 210 are disposed at transversely spaced locations above the feed path in alignment with idler rolls 58, LED 208 being relatively adjacent to left sidewall 28 and LED 210 being relatively adjacent to right sidewall 30. LEDs 208 and 210 direct light onto respective photodiodes 204 and 206 disposed beneath the feed path at positions in alignment with upper acceleration rolls 54.

Figure 7:
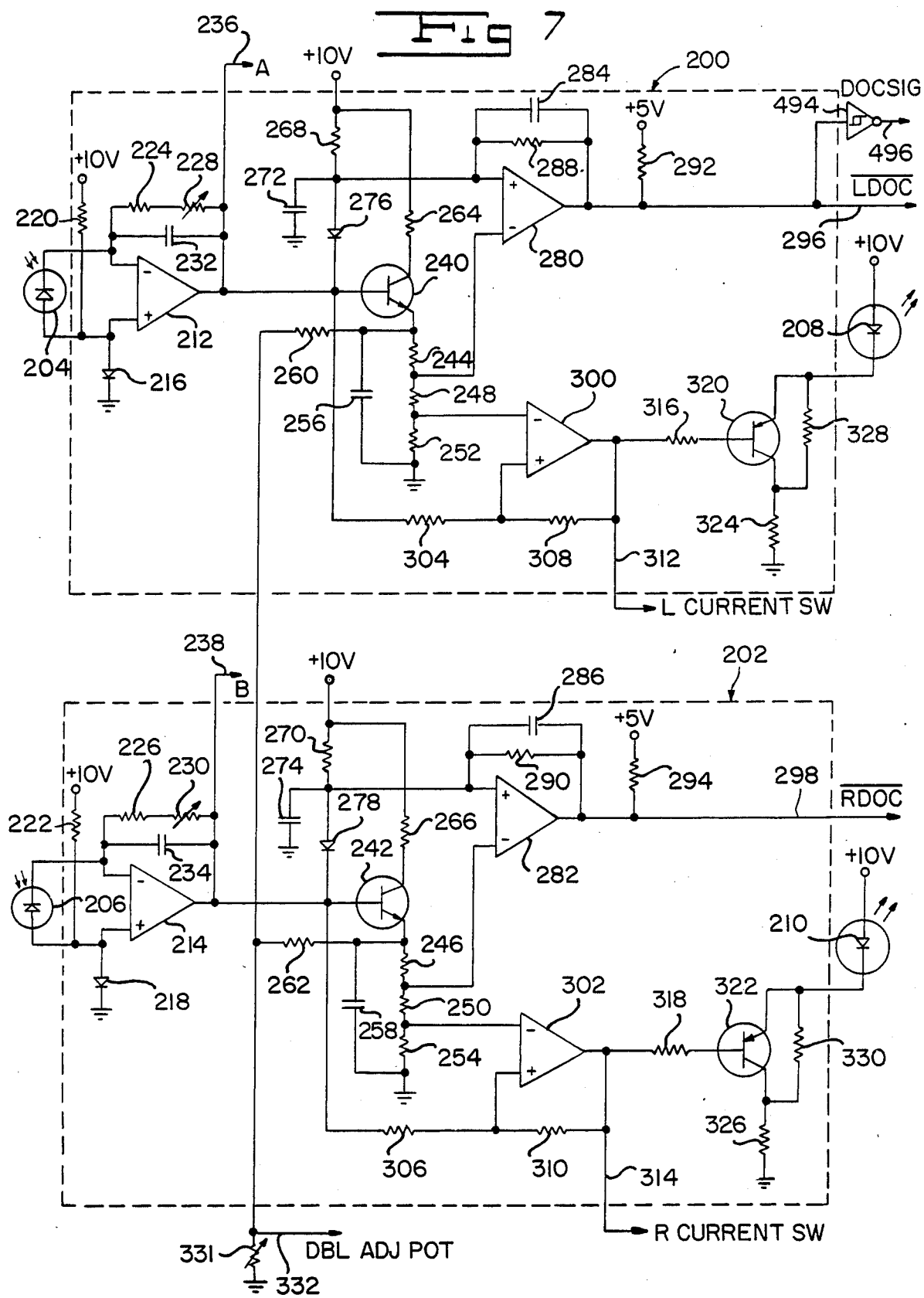
FIG. 7 is a schematic diagram of the left and right document sensor circuits of the apparatus of FIG. 1.

Referring to FIG. 7, photodiode 204 and LED 208 are coupled to a left sensor circuit indicated generally by the reference numeral 200, while photodiode 206 and LED 210 are similarly coupled to a right sensor circuit indicated generally by the reference numeral 202. Since the operation of sensor circuits 200 and 202 is identical, the following description will refer to only one circuit, the left sensor circuit 200. In the left sensor circuit 200, photodiode 204 has its cathode and anode coupled respectively to the inverting and noninverting inputs of an operational amplifier (OA) 212. Amplifier 212 also has its noninverting input coupled to the anode of a diode 216, the cathode of which is coupled to ground. A resistor 220 couples the noninverting input of amplifier 212 to a 10-volt positive voltage source. A capacitor 232 in parallel with a series-coupled resistor 224 and gain-adjusting potentiometer 228 couple the output of amplifier 212 to the inverting input.

Amplifier 212 provides an analog signal A on line 236 which is relatively low, or negative, whenever a document 38 is in the feed path between LED 208 and photodiode 204 and relatively high, or positive, in the absence of a document opposite the photodiode. The analog A signal on line 236 provides one input to the doubles detection circuit to be described. The A signal is also applied to the base of an NPN transistor 240, the emitter of which is coupled to ground by series-coupled resistors 244, 248 and 252. Transistor 240 functions in a manner to be described as a charge pump for a capacitor 256 coupled between the emitter of transistor 240 and ground. A resistor 260 couples the emitter of transistor 240 to a DBL ADJ POT line 332 coupled to ground through a potentiometer 331. Preferably, potentiometer 331 is contained on the same printed circuit board (not shown) as the display circuit shown in FIGS. 10 and 11. Line 332 provides a user-adjustable comparison signal to the doubles detection circuit to be described. A resistor 264 couples the collector of transistor 240 to the 10-volt supply. Capacitor 256 and resistors 244, 248, 252 and 260 have a relatively long time constant, on the order of about 0.7 second On the other hand, capacitor 256 and collector resistor 264 have a relatively short time constant, on the order of 1 millisecond As a result, capacitor 256 charges relatively rapidly and discharges relatively slowly so that it stores a potential representing the long-term average value of the analog signal A when no documents are present. This long-term average is used as a reference comparison potential to compensate for such factors as component aging, dust buildup, misalignment between the LED 208 and photodiode 204, and the like.

Line 236 is also coupled to the cathode of a diode 276, the anode of which is coupled to the noninverting input of an operational amplifier 280. The same input to amplifier 280 is also coupled to the 10-volt supply through a resistor 268 and to ground through a capacitor 272. Resistor 268 and capacitor 272, which have a time constant of about 3 milliseconds, cooperate with diode 276 to function as a hole-rejection circuit, which prevents small holes in sheets 38 from being falsely interpreted as gaps between adjacent sheets. As noted above, line 236 is relatively negative whenever a sheet 38 is present between LED 208 and photodiode 204. Any hole in sheet 38 will produce a positive-going spike on line 236. However, diode 276 prevents this spike from reaching the noninverting input of amplifier 280 until capacitor 272 has charged to an appropriate level through resistor 268. In this manner, holes of less than a predetermined dimension in the direction of feed (e.g., 0.25–0.30 inch) are disregarded by amplifier 280.

Amplifier 280 has its inverting input coupled to the junction of resistors 244 and 248 and its output coupled to the noninverting input through parallel-connected capacitor 284 and a hysteresis resistor 288. A resistor 292 couples the output of amplifier 280 to a 5-volt DC supply. Amplifier 280 acts as a comparator, providing a low-level $\overline{\text{LDOC}}$ signal on line 296, indicating presence of a document between LED 208 and photodiode 204, whenever the potential across capacitor 272 falls below a predetermined proportion (87% in the circuit shown) of the potential across capacitor 256.

Line 236 is also coupled through a resistor 304 to the noninverting input of an amplifier 300, the inverting input of which is coupled to the junction of resistors 248 and 252. A hysteresis resistor 308 provides a positive feedback coupling between the output of amplifier 300 and the noninverting input. Resistor 308 may optionally have a capacitor (not shown) in parallel therewith. The output of amplifier 300 appears on a L CURRENT SW line 312, which is used to control the doubles detection circuit to be described. Amplifier 300 functions as a digitizing comparator to provide a low-level digital signal on line 312 whenever the level on A line 236 drops below the potential existing across resistor 252, which is about 43% of the potential across capacitor 256 in the circuit shown. The output of amplifier 300 is also supplied through a resistor 316 to the base of a PNP transistor 320, the collector of which is coupled to ground through a resistor 324. The emitter of transistor 320 is coupled to the cathode of LED 208, the anode of which is coupled to the 10-volt supply. A resistor 328 provides an alternative path between the emitter and collector of transistor 320.

Transistor 320 functions as an emitter follower to energize LED 208 at one of two current levels, depending on the presence or absence of a document adjacent to photodiode 204. Following power-up, and in the absence of a document adjacent photodiode 204, line 312 remains at a high logic level, resulting in a small difference of potential between the base and the 10-volt supply to which the anode of LED 208 is connected. Accordingly, LED 208 is supplied with a relatively small amount of current. On the other hand, whenever a document is present between LED 208 and photodiode 204, line 312 changes to a low logic level, increasing the potential difference between the base of transistor 320 and the 10-volt supply. LED 208 is accordingly energized at a higher intensity. By energizing LED 208 at a lower level of intensity in the absence of a document, the average power consumption of LED 208 is significantly reduced, thereby extending its useful life.

As noted above, right sensor circuit 202 operates in a manner identical to that of left sensor circuit 200. Components 214, 218, etc. of circuit 202 correspond to respective components 212, 216, etc. of circuit 200. Circuit 202 thus provides an analog signal B on line 238 which is relatively low whenever a document is present between LED 210 and photodiode 206. During the presence of such document, circuit 202 also provides low-level digital signals on $\overline{\text{RDOC}}$ line 298, as well as R CURRENT SW line 314, used by the doubles detection circuit to be described. Circuit 202 also has its capacitor 258, corresponding to capacitor 256 of circuit 200, coupled through a resistor 262 to DBL ADJ POT line 332. Resistors 260 and 262 are so proportioned relative to potentiometer 331 that adjustment of the potentiometer produces a potential on line 332 varying between zero and about 43% of the average potential across capacitors 256 and 258.

Referring now to FIG. 8, the endorser sensor circuit, indicated generally by the reference numeral 334, includes a normally open switch 336 coupled between the 5-volt DC supply and the anode of an LED 338. Referring to FIGS. 4 and 5, switch 336 is mounted on left sidewall 28 of apparatus 20 at such a location that movement of lever arm 170 to the upper, "endorser on" position moves cam 164 against the feeler of switch 336, closing the switch. The LED 338 to which switch 336 is coupled electrically is mounted on bracket 172 as shown in FIGS. 4 and 5. Referring again to FIG. 8, LED 338 has its cathode coupled to ground through a resistor 340 and to the input of a logic inverter 342. Closure of switch 336 upon movement of lever arm 170 (FIG. 4) to its upper position energizes LED 338 to provide an indication to the user that the endorser roll 62 (FIG. 1) is in an engaged position. Closure of switch 336 also supplies a high-level input to inverter 342, producing a low level output from inverter 342 on $\overline{\text{SLOW}}$ line 344. Line 344 is used to control the speed of the drive members in a manner to be described. A second inverter 346 responsive to the output of inverter 342 has its output coupled to the 5-volt supply through a resistor 348 as well as to the gate of a field-effect transistor (FET) 350. FET 350 has its drain connected to the movable contact of a potentiometer 354 coupled between ground and a resistor 352 coupled to a MOTV (motor voltage) line 356 which is supplied with a potential in a manner to be described. In a similar manner, FET 350 has its source coupled to the movable contact of a potentiometer 362, the fixed contacts of which are coupled respectively to ground and to a resistor 360 coupled to line 356. Respective capacitors 358 and 364 are coupled in parallel with potentiometers 354 and 362. FET 350 also has its drain coupled to an N-S ("normal-slow") line 366.

Components 346 to 364 of circuit 334 provide a reference comparison signal at one of two analog levels, depending on whether the endorser module 64 is engaged. Whenever the endorser module 64 is disengaged, FET 350 remains nonconductive, causing line 366 to assume a level of potential determined by the potential on MOTV 356 and the setting of potentiometer 354. Closure of switch 336 upon engagement of endorser module 64 produces a high-level signal from inverter 346, rendering FET 350 conductive. As a result of the coupling now established with potentiometer 362, line 366 assumes a different potential, the level of which may be controlled by adjusting the setting of potentiometer 362.

The doubles detection circuit, indicated generally by the reference numeral 368, is used to detect the presence of at least partly superimposed sheets having an overlap of about 0.5 inch or more in the direction of feed. (Sheets having a lesser degree of overlap are detected by the chain note circuit of FIG. 9, which is responsive to sheet length.) Circuit 368 includes left and right comparators 370 and 372, the inverting inputs of which receive analog signals from A line 236 and B line 238, respectively. The noninverting inputs of comparators 370 and 372 are coupled to DBL ADJ POT line 332. Comparators 370 and 372 have their outputs coupled to the 10-volt supply through respective resistors 378 and 380 and to the control inputs of analog switches 374 and 376. Switch 374 couples A line 236 to a grounded capacitor 386 through a resistor 382, while switch 376 couples B line 238 to a capacitor 388 through a resistor 384. A second pair of analog switches 390 and 392 couple respective capacitors 386 and 388 to a capacitor 400. Switches 390 and 392 have their control inputs coupled to the 10-volt supply through a resistor 398 and to the anodes of respective diodes 394 and 396, the cathodes of which receive signals from lines 312 and 314, respectively. A comparator 404 has its inverting input coupled to the 5-volt supply, through a resistor 402, as well as to capacitor 400. The noninverting input of comparator 404 is coupled to the movable contact of a potentiometer 406 coupled between ground and the N-S line 366. A resistor 408 couples the output of comparator 404 to the 5-volt supply.

In the absence of a document along the feed path switches 390 and 392 are closed, while switches 374 and 376 are open. As a result, capacitors 386, 388 and 400 are charged through resistor 402 to a potential approximating 5 volts. Movement of a sheet 38 between LEDs 208 and 210 and photodiodes 204 and 206 first produces low-level signals on lines 312 and 314, respectively, opening switches 390 and 392 to uncouple resistor 402 from capacitors 386 and 388. Thereafter, whenever the potentials on analog A line 236 and B line 238 fall below the potential on DBL ADJ POT line 332, comparators 370 and 372 actuate respective switches 374 and 376. Capacitors 386 and 388 then begin discharging through respective resistors 382 and 384 at rates dependent on the difference between the capacitor potentials and the potentials on lines 236 and 238. Since the potentials on lines 236 and 238 vary with the optical density of the sheets 38, the rates of discharge of capacitors 386 and 388 vary similarly so long as switches 374 and 376 remain closed. Capacitors 386 and 388 momentarily stop discharging, of course, whenever switches 374 and 376 reopen in response to rises in the potentials on A and B lines 236 and 238. Resistors 382 and 384 and capacitors 386 and 388 should have a suitably long time constant (e.g., 10 milliseconds), so that capacitors 386 and 388 continue to discharge whenever switches 374 and 376 close while the sheet 38 is moving past photodiodes 204 and 206.

When the sheet 38 clears photodiodes 204 and 206, the potentials on lines 236 and 238 again rise to levels exceeding the potential on line 332, causing comparators 370 and 372 to reopen switches 374 and 376. Capacitors 386 and 388 continue, however, to hold the potentials to which they have by this time discharged. Almost immediately thereafter, lines 312 and 314 change to high logic levels, reclosing switches 390 and 392. As a result, the inverting input to comparator 404 momentarily assumes the average of the potentials of capacitors 386 and 388. This average potential will depend on the average optical density of the sheet 38 that has just been scanned and will be abnormally low for optical densities indicative of a double feed. If the average potential of capacitors 386 and 388 is below a predetermined proportion of the potential on N-S line 366, as determined by the setting of potentiometer 406, comparator 404 will supply a high-level signal to the input of a Schmitt trigger inverter 410, producing a low-level $\overline{DBL}$ signal on line 412 indicating a double feed. This signal is used in a manner to be described to provide an indication to the user and, if desired, to halt the operation of the apparatus 20. The momentarily generated $\overline{DBL}$ signal on line 412 terminates when capacitors 386 and 388 again charge through switches 390 and 392 to their initially stored potential.

The potentials to which capacitors 386 and 388 discharge during the movement of a sheet 38 past photodiodes 204 and 206 depend on the period during which the photodiodes are covered as well as the optical density of the sheet. Since the transit time depends on the drive speed for a document of given length, a system that simply compared the final potentials of capacitors 386 and 388 with a fixed potential would be undesirably sensitive to drive speed. By supplying a comparison potential from line 366 that also varies with the drive speed, this undesirable dependence can be largely eliminated.

Figure 18:
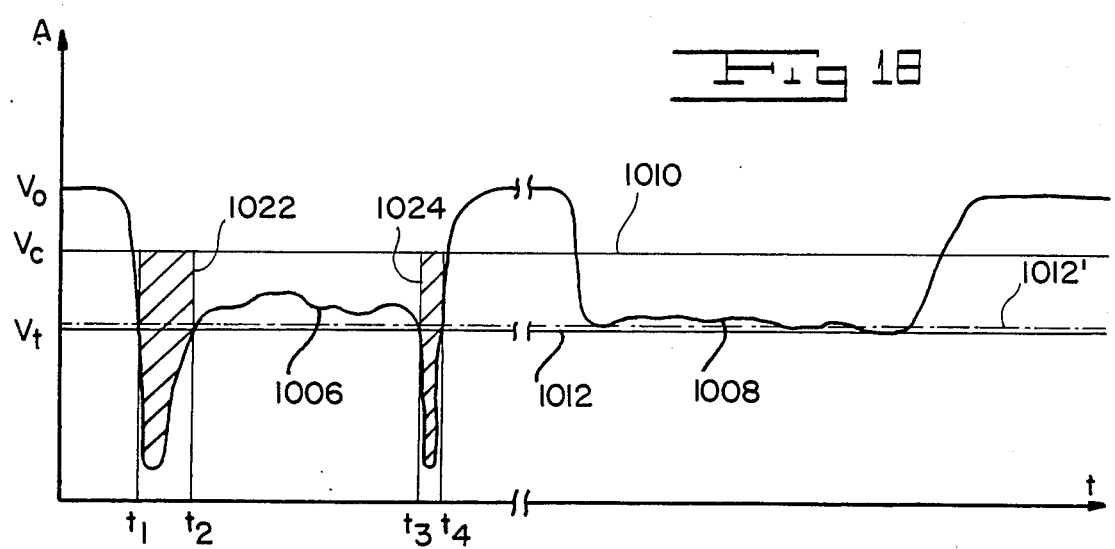
FIG. 18 is a voltage diagram illustrating the method of doubles detection implemented by the circuit of FIGS. 7 and 8.

FIG. 18 depicts graphically the manner of operation of the circuits 200, 202 and 368 shown in FIGS. 7 and 8. The A signal on line 236, which is assumed to be at a level V in the absence of a document, may typically have waveform 1006, with its initial and final valleys, for doubly fed (i.e., superimposed) clean $5 bills and waveform 1008 for a single dirty $20 bill. The doubles adjustment pot 331 is set to provide a DBL ADJ POT signal on line 332 equal to a threshold level $V_t$ (line 1012 in FIG. 18) representing a greater than average optical density. Under these conditions, switch 374 may remain open during the entirety of the single-$20 signal 1008 and only closes during those periods of time $t_1$-$t_2$ and $t_3$-$t_4$ when the double-$5 signal 1006 dips below the threshold level $V_t$. As a result, capacitor 386 and resistor 382 effectively integrate the areas 1022 and 1024, where $V_c$ (line 1010 in FIG. 18) is the potential initially stored in capacitor 386. Circuit 368 only integrates, therefore, during that period when the A (or B) signal goes below the threshold level $V_t$ representing a greater than average density. Further, circuit 368 integrates at a rate proportional to the difference between the A or B signal level and a predetermined constant (in this case $V_c$). As a result, the disclosed circuit is highly capable of discriminating between singly fed and doubly fed documents. Even if the threshold voltage $V_t$ is somewhat higher, e.g. at a level 1012' in FIG. 18, the integration result for waveform 1008 is negligible compared with that for waveform 1006, and the signals remain clearly distinguishable.

Figure 16:
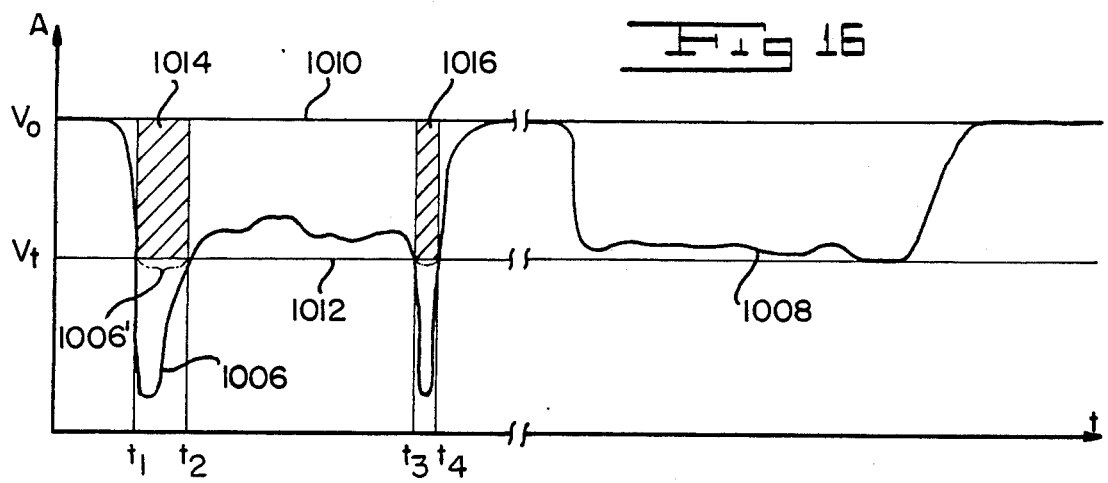
FIG. 16 is a voltage diagram illustrating a method of doubles detection based upon the total amount of time that the optical density signal falls below a threshold level.

By way of comparison, FIG. 16 shows how circuit 368 would operate if resistor 382 and capacitor 386 were fed a constant-level potential rather than the variable-level signal A whenever switch 374 is closed. In such a system, the areas integrated would be the purely rectangular areas 1014 and 1016 shown, and the degree to which the signal A dipped below the threshold $V_t$ would be irrelevant. As a result, the system could not distinguish betwen waveform 1006, representing doubly fed $5 bills, and a waveform 1006' for, say, a single $20 bill that dipped very slightly below $V_t$ between $t_1$ and $t_2$ and between $t_3$ and $t_4$. Both signals 1006 and 1006' would be interpreted as doubles.

Figure 17:
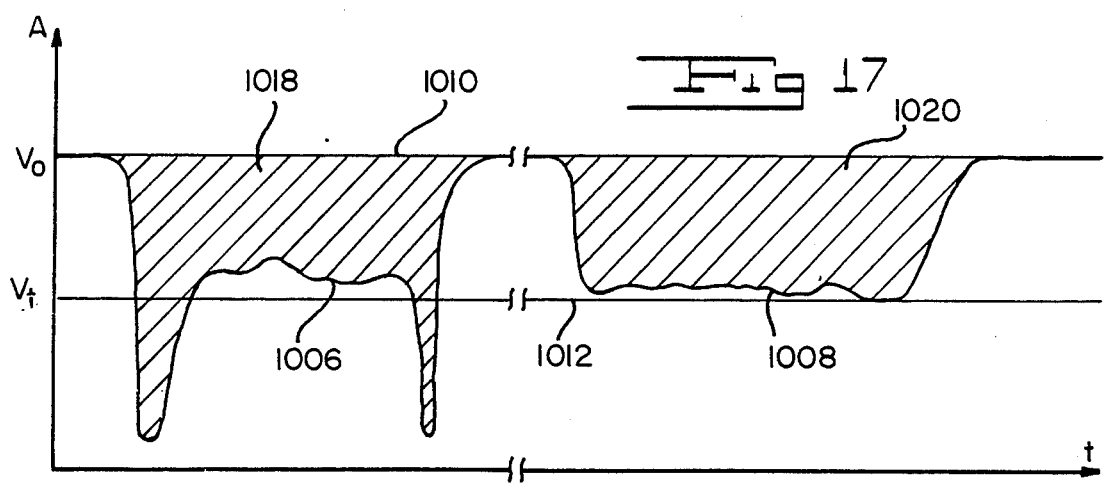
FIG. 17 is a voltage diagram illustrating a method of doubles detection based upon the total integral of the optical density signal.

As a further comparison, FIG. 17 shows how circuit 368 would operate if resistor 382 and capacitor 386 were fed the variable-level signal A for the entire durations of signals 1006 and 1008, rather than only when the signals went below the threshold $V_t$ representing a greater than average optical density. Such a system would integrate the areas 1018 and 1020 between the respective signals 1006 and 1008 and the upper bound 1010 (A=$V_0$), without regard to whether the signal A crossed the threshold Vt Since, in this particular example, the areas 1018 and 1020 are nearly equal, any system that reliably detected the true double signal 1006 would also be susceptible to falsely detecting the single signal 1008 as a double.

The half-note detection circuit, indicated generally by the reference numeral 414, includes an exclusive NOR gate 416 having its two inputs coupled to $\overline{LDOC}$ line 296 and $\overline{RDOC}$ line 298. Exclusive NOR gate 416 has its output coupled to a capacitor 422 through a resistor 418 as well as through a diode 420 having its anode coupled to the gate output. A comparator 424 having its inverting input coupled to N-S line 366 and its noninverting input coupled to capacitor 422 provides a HALFNOTE signal on line 426. A diode 427 having its cathode coupled to line 426 couples comparator 424 to an ERR line 428. A Schmitt trigger inverter 432 has its input coupled to ERR line 428 as well as to the 5-volt supply through a resistor 430. Inverter 432 provides a complemented ERR signal on line 434.

Normally, exclusive NOR gate 416 supplies a high-level output to comparator 424, producing a high-level signal on line 426. If a sheet 38 is missing a lateral half, only one of lines 296 and 298 will change to a low logic level as the sheet passes photodiodes 204 and 206. As a result, exclusive NOR gate 416 changes to a low logic output, allowing capacitor 422 to discharge through resistor 418. Capacitor 422 ultimately discharges to a level below the potential on N-S line 366, causing comparator 424 to produce a low-logic-level HALFNOTE output on line 426. Diode 427 transmits this signal to line 428 to produce error signals on that line and ERR line 434. These error signals are used to halt the drive of the apparatus 20. Resistor 418 and capacitor 422 should have a suitably long time constant so that a HALF NOTE signal is not erroneously generated immediately upon sensing a slightly skewed sheet 38, but only after a suitable delay of, say, 25 milliseconds. Diode 420 allows NOR gate 416 to recharge capacitor 422 rapidly after lines 296 and 298 assume the same logic level. Since the comparison potential from line 366 is itself speed-dependent, any undesirable sensitivity of the half-note detection circuit 414 to drive speed is minimized.

The jam detection circuit, indicated generally by the reference numeral 436, includes respective capacitors 446 and 448 which are coupled to LDOC line 296 and RDOC line 298 through resistors 442 and 444. Respective diodes 438 and 440 connected in parallel across resistors 442 and 444 permit rapid recharging of capacitors 446 and 448 from lines 296 and 298. Capacitors 446 and 448 are coupled to the noninverting inputs of respective comparators 450 and 452, which have their inverting inputs coupled to N-S line 366.

Normally, lines 296 and 298 are at high logic levels. When either line changes to a low logic level in response to the movement of a sheet 38 past the corresponding photodiode 204 or 206, the low-logic-level signal on the line causes the capacitor 446 or 448 to discharge through resistor 442 or 444. If the potential of capacitor 446 or 448 discharges to a level below the potential of line 366, the corresponding comparator 450 or 452 provides a low-level output on an LDOCJAM line 454 or RDOCJAM line 456. Respective diodes 458 and 460 couple these low-logic-level signals to ERR line 428, also producing a high-level ERR signal on line 434.

Referring to FIG. 9, the chain note detection circuit, indicated generally by the reference numeral 462, detects overlapping sheets whose extent of overlap (less than 0.5 inch) is insufficient to trigger the doubles detection circuit 368 of FIG. 8. Circuit 462, which is preferably contained on a separate printed circuit board, includes a magnetic pickup coil 466 positioned adjacent to a magnetic timing gear 464 carried by acceleration roll shaft 56 (FIG. 1). Coil 466 is coupled to the inputs of an operational amplifier 468. Amplifier 468 also has its noninverting input coupled to the 5-volt supply through a resistor 470, its inverting input coupled to ground through a resistor 474, and the two inputs coupled to each other through a capacitor 472 in parallel with the coil 466. Amplifier 468 has its output coupled to ground through a capacitor 480, to the 5-volt supply through a resistor 478 and to the noninverting input through a resistor 476. A second operational amplifier 484 has its inverting input coupled to the amplifier 468 directly and its noninverting input coupled to the amplifier through a resistor 482. Amplifier 484 also has its noninverting input coupled to ground through a resistor 486 and to its output through a resistor 488. A resistor 490 couples the output of amplifier 484 to the 5-volt supply.

Rotation of shaft 46 produces a sinusoidal signal across coil 466, which is digitized by amplifiers 468 and 484 to produce a square-wave CLK signal on line 492, having a frequency proportional to the angular velocity of the shaft 56. This signal is applied to the clock (CLK) input of a D-type flip-flop 498, as well as to the data (1A) input of one 4-bit section of a two-section binary ripple counter 518.

Flip-flop 498 has its D input coupled to LDOC line 296 (FIG. 7), its clear (CLR) input coupled to the 5-volt supply and its preset (PR) input coupled to a CLRERR line 516, which is supplied with a negative-going pulse on system startup and after clearance of an error condition. Flip-flop 498 provides a Q output which generally follows the signal on line 296, but which is synchronized to positive-going transitions on CLK line 492. Flip-flop 498 has its Q output coupled to the CLK input of a second D-type flip-flop 500, the D input of which is coupled to the Q̄ output of flip-flop 500, the CLR input of which is coupled to line 516, and the PR input of which is coupled to the 5-volt line. Flip-flop 500 thus provides Q and Q̄ outputs that change logic levels upon each positive going transition in the Q output of flip-flop 498 after a document 38 has cleared photodiode 204.

The highest bit (1QD) output of the first section of counter 518 is coupled to the clock (2A) input of the second section of counter 518, so that the two counter sections function effectively as a single 8-bit counter. In the absence of a sheet, the Q output of flip-flop 498 remains high, disabling the counter 518. Whenever the Q output of flip-flop 498 changes to a low logic level during the movement of a document 38 past photodiode 204, counter 518 is allowed to count the CLK pulses generated on line 492 synchronously with the rotation of shaft 46. Counter 518 has its outputs coupled to the digital inputs of each of a pair of digital-to-analog converters (DACs) 520 and 522 (NC0832 or equivalent in the circuit shown). DACs 520 and 522 have their WR inputs coupled to the Q and the Q̄ outputs, respectively, of flip-flop 500. Immediately after flip-flop 498 changes to a positive logic level following the movement of a sheet 38 past photodiode 204, the digital output of counter 518 is strobed into one of DACs 520 and 522, depending on which of the outputs of flip-flop 500 is going negative at this time. DACs 520 and 522 thus store, in an alternating fashion, signals representing the number of CLK pulses on line 492 required for successive sheets 38 to pass the photodiode 204. After the output of counter 518 has been strobed into one of DACs 520 and 522, flip-flop 498 charges a capacitor 510 through parallel-connected diode 506 and resistor 508 to reset counter 518 in preparation for another counting cycle.

Converters 520 and 522 have their VREF outputs coupled to the noninverting inputs of respective operational amplifiers 524 and 526. Amplifier 524 has its inverting input coupled to ground through a resistor 532 and to the amplifier output through parallel-coupled resistor 528 and capacitor 540. Amplifier 524 drives the noninverting input of a comparator 552 as well as a pair of series-coupled resistors 544 and 548. In a similar manner, amplifier 526 has its inverting input coupled to ground through a resistor 534 and to the amplifier output through parallel-coupled resistor 530 and capacitor 542. Amplifier 526 drives the noninverting input of a comparator 554 as well as series-coupled resistors 546 and 550. Comparators 552 and 554 each have their outputs coupled to the 5-volt supply through a resistor 556 and to the D input of a D-type flip-flop 504. Flip-flop 504 has its CLR input coupled to the 5-volt supply and its CLK input coupled to the output of flip-flop 498. The preset (PR) input of flip-flop 504 is derived from the Q output of a D-type flip-flop 502, the PR and D inputs of which are coupled to the 5-volt supply and the CLR input of which is coupled to line 516. The Q output of flip-flop 504 appears on a $\overline{\text{CHAIN NOTE}}$ line 512. Each of the converters 520 and 522 has its OUT2 output coupled to an analog ground and its OUT1 output coupled to the inverting input and output of an operational amplifier 564. The noninverting input of amplifier 564 is coupled to the junction of a resistor 558 coupled to the 5-volt supply and a grounded resistor 560 in parallel with a capacitor 562.

Amplifiers 524 and 526 provide analog outputs indicating the respective counts obtained for two successive sheets 38, the counts being representative of the sheet length. Each of comparators 552 and 554 compares one of these analog counts with a predetermined fraction (about 70% in the embodiment shown) of the other count, obtained from the voltage divider comprising resistors 544 and 548 or resistors 546 and 550. If the count for a given sheet is less than said predetermined fraction, one of comparators 552 and 554 will produce a low output, causing flip-flop 504 to change to a low Q output when flip-flop 498 changes state at the end of a sheet. The Q output of flip-flop 504 appears as a low $\overline{\text{CHAIN NOTE}}$ signal on line 512, indicating that the present document is either abnormally long or abnormally short in the direction of feed as compared with the previous document. Referring to FIG. 8, a diode 514 transmits this signal to $\overline{\text{ERR}}$ line 428.

Referring again to FIG. 9, flip-flop 502 is initially set at a low logic level by the signal on line 516, and remains at this level until flip-flop 498 changes to a high logic level following the passage of the first sheet. Since the Q output of flip flop 502 is applied to the PR input of flip-flop 504, the latter flip-flop cannot change to a low logic level at least until the second document has passed photodiode 504. This prevents a $\overline{\text{CHAIN NOTE}}$ signal from being erroneously generated on line 512 as the result of only a single pulse count.

An operational amplifier 566 has its noninverting input coupled to the junction of resistors 558 and 560, which supplies a reference potential. Amplifier 566 has its inverting input coupled to the 5-volt supply through a resistor 570 as well as to a line 568. The output of amplifier 566 is coupled to the cathode of a light-emitting diode (LED) 572, the anode of which is coupled to the 5-volt supply through a resistor 574.

LED 572 is used as an indicator of the logic level of a signal applied to input line 568. This line may be coupled to suitable test points such as $\overline{\text{CHAIN NOTE}}$ line 512, $\overline{\text{HALFNOTE}}$ line 426, $\overline{\text{LDOC JAM}}$ line 454 and $\overline{\text{RDOC JAM}}$ line 456 (FIG. 8). Thus the serviceman may test for the momentary existence of a logic level on these lines without the necessity of separate indicators for each line. Advantageously, amplifier 566 may be an unused section of an integrated circuit, such as an LM324 or the equivalent, which also includes amplifiers 524, 526 and 564.

Figure 11:
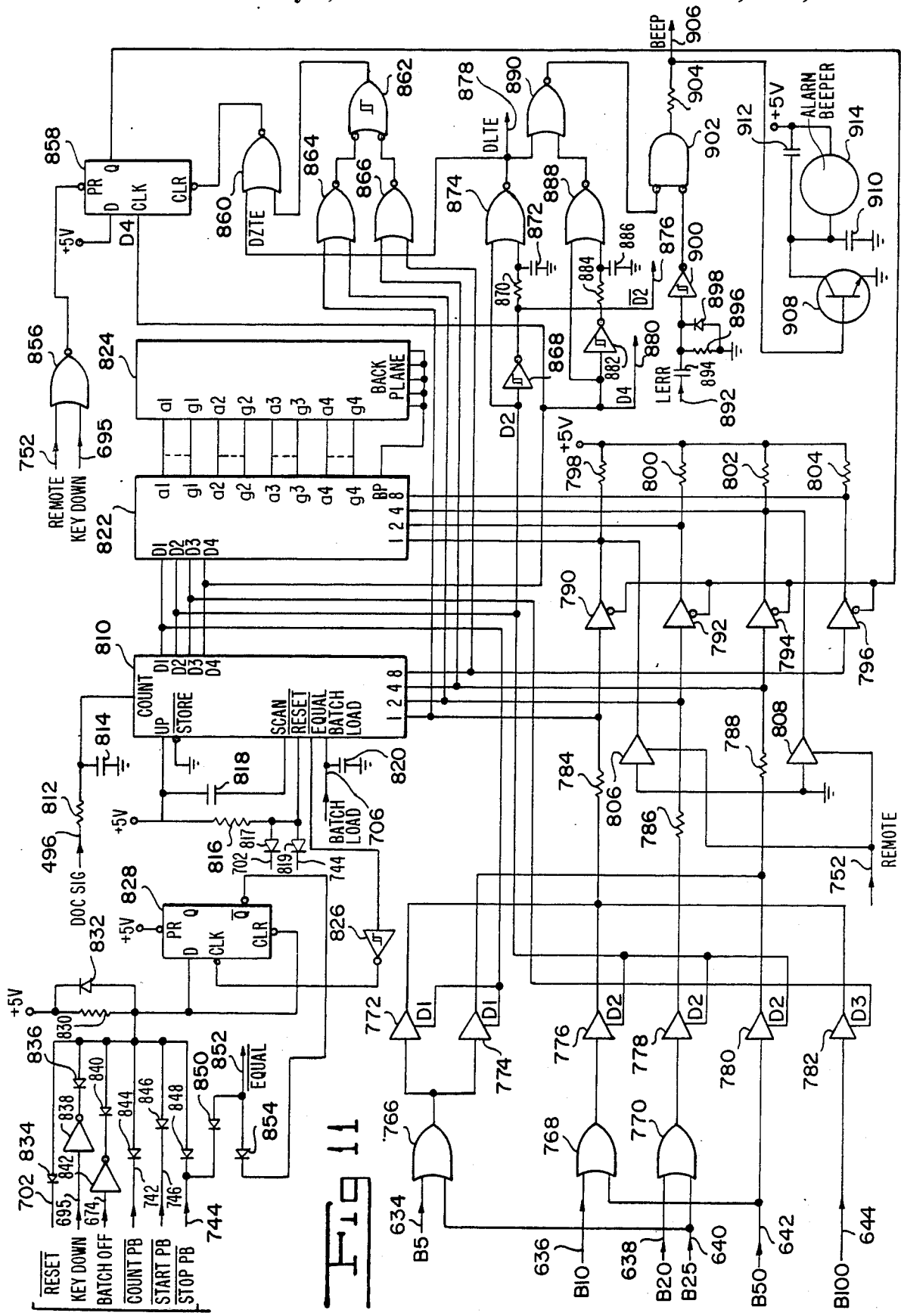
FIG. 11 is a schematic diagram of the remainder of the display circuit of the apparatus shown in FIG. 1.

The display circuit of the apparatus 20, indicated generally by the reference numeral 576 and shown in FIGS. 10 and 11, is preferably contained on a separate printed circuit board. Referring first to FIG. 10, circuit 576 includes a plurality of normally open, user-actuated push-button switches 578, 580, 582, 584, 586 and 588, for selecting the desired batch size, as well as a "count" switch 590. Switches 578 to 590 have their fixed contacts coupled to the 5-volt supply through respective resistors 592 to 604 and to ground through respective capacitors 606 to 618. The same fixed contacts of switches 578 to 590 are also coupled to the respective D inputs of an eight-section flip-flop 620. The unused D input of flip-flop 620 is grounded. The Q outputs of flip-flop 620 corresponding to switches 578 to 588 are coupled to the anodes of respective diodes 622 to 632, the cathodes of which are coupled to the strapped inputs of a Schmitt trigger NAND gate 672. Gate 672, which also has its inputs coupled to ground through a resistor 670, provides an output on a BATCHOFF line 674. The Q outputs of flip-flop 620 corresponding to switches 578 to 588 also appear on respective lines 634 to 644 indicating the batch size selected by the user. Thus, B5 line 634 indicates a batch size of 5, whereas B100 line 644 indicates a batch size of 100 sheets 38. Lines 634 to 644 are coupled to the anodes of respective light-emitting diodes (LEDs) 646 to 656, the cathodes of which are coupled to ground through respective resistors 658 to 668.

The movable contacts of each of switches 578 to 590 are coupled to the emitter of an NPN transistor 682, the base of which is coupled through a resistor 680 to the junction of a capacitor 676 coupled to the 5-volt supply and a grounded resistor 678. Transistor 682 has its collector coupled to the fixed contact of count switch 590. The emitter of transistor 682, which is coupled to ground through a resistor 684, drives the base of a second NPN transistor 686. Transistor 686 has its emitter grounded and its collector coupled to the 5-volt supply through a resistor 688. The collector of transistor 686 drives the base of a transistor 690, the emitter of which is grounded and the collector of which is coupled to the 5-volt supply through a resistor 692. A diode 694 having its cathode coupled to the collector of transistor 690 couples that transistor to the D input of a D-type flip-flop 696, whose CLR input receives a signal from a $\overline{\text{D2}}$ line 876 to be described and whose CLK input receives a signal from a D4 line 880 to be described. Flip-flop 696 also has its D input coupled to the 5-volt supply through a resistor 698 and to a RESET line 702 through a diode 700.

Respective push-button switches 708, 710, 712, 714 and 716, the movable contacts of which are grounded, have their fixed contacts coupled to the 5-volt supply through resistors 718 to 726 and to ground through capacitors 728 to 736. User actuation of switch 712, 714 or 716 produces a low-level $\overline{\text{CONTINUE PB}}$ signal on line 742, a $\overline{\text{STOP PB}}$ signal on line 744 or a $\overline{\text{START PB}}$ signal on line 746, respectively. Switch 708 has its fixed contact coupled to the strapped inputs of a Schmitt trigger NAND gate 738, the output of which drives the CLK input of a D-type flip-flop 742. Flip-flop 742 has its PR input coupled to a $\overline{\text{POWERON}}$ line 744 coupled to the 5-volt supply through a resistor 746 and to ground through a capacitor 748. The Q and $\overline{\text{Q}}$ outputs of flip-flop 742 respectively drive $\overline{\text{REMOTE}}$ line 750 and REMOTE line 752. The latter line is also coupled to the D input of flip-flop 742. In a similar manner, switch 710 has its fixed contacts coupled to the strapped inputs of a Schmitt trigger NAND gate 740, the output of which drives the CLK input of a D-type flip-flop 754. Like flip-flop 742, flip-flop 754 has its PR input coupled to line 744, its CLR input coupled to the 5-volt line and its D input coupled to the $\overline{Q}$ output. In addition, the Q and $\overline{Q}$ outputs of flip-flop 754 provide signals on DBLON line 756 and $\overline{\text{DBLON}}$ line 758, respectively. Line 756 is also coupled to the anode of a light-emitting diode (LED) 760, the cathode of which is coupled to ground through a resistor 762.

Each closure of switch 708 produces a change of state of "remote" flip-flop 742, the outputs of which indicate whether the apparatus 20 is to be controlled by a central control unit (not shown). In a similar manner, each closure of switch 710 produces a change of state of "doubles on" flip-flop 754, the outputs of which determine whether the detection of a double triggers a machine halt. LED 760 indicates that the apparatus is in a "doubles on" condition and will halt upon detection of a double feed. Apparatus 20 is started by closing switch 716, stopped by closing switch 714 and restarted by closing switch 712.

Batch load flip-flop 696 periodically receives a CLR pulse from D2 line 876 and a CLK pulse from D4 line 880 (FIG. 11). In the absence of any actuation of switches 578 to 590, flip-flop 696 will remain reset as a result of the periodic D2 signal on line 876 and the low-level signal from the collector of transistor 690. If one of switches 578 to 588 is momentarily actuated to select a batch size, the emitter potential of transistor 682 rises to a relatively high level, producing in turn a relatively low potential at the collector of transistor 686 and a high potential at the collector of transistor 690 and on KEYDOWN line 695. This high potential from transistor 690 in turn allows flip-flop 696 to be set upon the appearance of the next positive-going pulse on D4 line 880. Actuation of one of switches 578 to 588 also produces a low-level signal at the corresponding D input of flip-flop 620, allowing that portion of flip-flop 620 to be set in response to the positive-going Q output of flip-flop 696. Flip-flop 620, upon being actuated in this manner, energizes one of LEDs 646 to 656 to indicate the selection of a particular batch size, and produces a batch selection signal on one of lines 634 to 644. The appearance of a high-level signal on one of lines 634 to 644 causes BATCHOFF line 674, initially at a high level, to change to a low logic level.

Referring to FIG. 11, a first OR gate 766 responsive to signals from B5 line 634 (FIG. 10) and B25 line 640 drives a pair of buffers 772 and 774 which receive enable inputs from a D1 line to be described. A second OR gate 768 responsive to the B10 signal on line 636 and the B50 signal on line 642 drives a single buffer 776 receiving an enable input from a D2 line to be described. A third OR gate 770 responsive to B20 line 638 and to B25 line 640 drives a buffer 778 also responsive to the D2 enable signal. Finally, B50 line 642 and B100 line 644 directly drive buffers 780 and 782 controlled by respective enable signals D2 and D3. Buffers 772, 776 and 782 have their outputs coupled through a resistor 784 to a buffer 790. In a similar manner, respective resistors 786 and 788 couple the respective outputs of buffers 778 and 780 to buffers 792 and 794. Buffers 790 to 794, together with a buffer 796, have their outputs coupled to the 5-volt line through respective resistors 798 to 804. Buffers 790 and 794 also have their outputs strapped to the outputs of respective buffers 806 and 808, the inputs of which are grounded and the enable terminals of which are coupled to REMOTE line 752 (FIG. 10).

The inputs to buffers 790 to 794 are also applied to the 1, 2 and 4 inputs, respectively, of a four-digit LED display programmable up/down counter 810, which may be an Intersil ICM7217 or equivalent. Counter 810 has its COUNT input coupled to ground through a capacitor 814 and to a DOCSIG line 496 through a resistor 812. Referring to FIG. 7, the DOCSIG signal, which is the logical complement of the $\overline{\text{LDOC}}$ signal, is derived from a Schmitt trigger inverter 494 coupled to line 296. Counter 810 has its UP input coupled to the 5-volt line directly, its $\overline{\text{RESET}}$ input coupled to the 5-volt line through a resistor 816 and through isolating diodes 817 and 819 to low-level signals on lines 702 and 744, and its SCAN input coupled to the 5-volt supply through a capacitance 818 of about 1 picofarad. The BATCH LOAD input of counter 810, which is also coupled to ground through a capacitor 820, is coupled to BATCH LOAD line 706 (FIG. 10). The D1 to D4 outputs of counter 810 drive the corresponding inputs of a display driver 822, which may be an Intersil ICM7211A. Display driver 822 receives its 1, 2, 4 and 8 bit inputs from buffers 790 to 796, respectively. The segmental outputs a1-g1, a2-g2, a3-g3 and a4-g4 of driver 822 drive the corresponding inputs of a four-digit segmental liquid crystal display (LCD) 824. Driver 822 also has its BP output coupled to the BACKPLANE inputs of display 824.

A Schmitt trigger inverter 826 couples the $\overline{\text{EQUAL}}$ output of counter 810 to the CLK input of a D-type flip-flop 828, the PR input of which is coupled to the 5-volt supply. Flip-flop 828 has its D and CLR inputs coupled to the anode of a diode 832, the cathode of which is coupled to the 5-volt supply. A resistor 830 provides a parallel path across diode 832. A diode 834 couples a low-level $\overline{\text{RESET}}$ signal on line 702 to the D input of flip-flop 828. The same flip-flop input is also responsive to the low-level output of an inverter 838, the input of which is coupled to KEYDOWN line 695 (FIG. 10) and the output of which is coupled to the flip-flop through a diode 836. A diode 840 has its anode coupled to the D input of flip-flop 828 and its cathode to the output of inverter 842, the input of which is derived from BATCHOFF line 674. Respective diodes 844, 846 and 848 provide the same flip-flop input with low-level signals from lines 742, 746 and 744, respectively. Respective diodes 850 and 854 supply $\overline{\text{EQUAL}}$ line 852 with low-level signals from line 744 and the $\overline{Q}$ output of flip-flop 828, respectively.

A NOR gate 856 responsive to REMOTE line 752 and KEYDOWN line 695 controls the PR input of a D-type flip-flop 858, the D input of which is coupled to the 5-volt line and the CLK input of which receives the D4 output from counter 810. Flip-flop 858 has its Q output coupled to inhibit inputs to buffers 790 to 796. The CLR input of flip-flop 858 receives a signal from a NOR gate 860, one input of which is derived from a Schmitt trigger NAND gate 862. Gate 862 in turn receives inputs from NOR gates 864 and 866. Gate 864 has its inputs coupled to the inputs to inverters 790 and 792, while gate 866 has its inputs coupled to the inputs to inverters 794 and 796.

In the alarm pulse generating portion of the display circuit 576, a Schmitt trigger inverter 868 responsive to the D2 signal from counter 810 is coupled through a resistor 870 to a capacitor 872 also coupled to one input of a NOR gate 874. In addition to driving gate 874, inverter 868 provides a $\overline{D2}$ signal on line 876. The other input of gate 874 is derived directly from the D2 line from counter 810. NOR gate 874 provides a D2TE signal on a line 878 coincident with the trailing edge of the signal D2. This signal is applied to the other input to NOR gate 860 as well as to one input of another NOR gate 890. NOR gate 890 receives its other input from a NOR gate 888, one input of which is coupled directly to the D4 line from counter D10. The latter counter output also appears on line 880. A Schmitt trigger inverter 882 responsive to the D4 signal is coupled through a resistor 884 to a capacitor 886 coupled to the other input to NOR gate 888.

NOR gate 890 drives one input of a NOR gate 902, the other input of which is derived from a Schmitt trigger inverter 900 coupled through a capacitor 894 to a LERR line 892 (FIG. 14) carrying a latched error signal. Inverter 900 also has its input coupled to the cathode of a diode 898, the anode of which is grounded. A resistor 896 provides a parallel path between the inverter input and ground. A resistor 904 couples the output of NOR gate 902 to a line 906, which carries a BEEP signal for possible use elsewhere in the apparatus 20. The BEEP signal drives the base of an NPN transistor 908, the emitter of which is grounded. An alarm beeper or electronic buzzer 914, which may be a Star QMB-06 or equivalent having a resonant frequency of approximately 2048 Hz, is coupled between the collector of transistor 908 and the 5-volt supply. A capacitor 912 provides a parallel path across beeper 914, while a capacitor 910 provides such a path between the collector of transistor 908 and ground.

Circuit elements 766 to 788 supply the binary-coded decimal (BCD) inputs 1, 2, 4 and 8 of counter 810 with appropriate signals representing the selected batch size in synchronism with the strobe pulses generated by counter 810 on lines D1 to D4. For example, if a batch count of 25 (=025) is selected, the first, or least significant, digit 5 of the count has a BCD representation of 0101, while the second digit 2 has a BCD representation of 0010 and the third digit has a BCD representation of 0000. Accordingly, the appearance of a first-digit signal D1 at the enabling inputs of circuits 772 and 774 produces high-level signals at the 1 and 4 inputs to counter 810. Similarly, the appearance of a second-digit signal D2 at the enabling input of circuit 778 results in the appearance of a high-level signal at the 2 input to counter 810. These signals are loaded into counter 810 in response to the BATCH LOAD signal produced on line 706 in response to the actuation of a batch selection key 578 to 588 (FIG. 10).

If instead of actuating one of switches 578 to 588 (FIG. 10), the user actuates switch 590 to initiate a count mode of operation, a high level output appears at the collector of transistor 690 and on KEYDOWN line 695, as before, allowing flip-flop 696 to be momentarily set in response to the D4 signal on line 880. In this mode of operation, however, no batch count is loaded into counter 810 (FIG. 11), and the counter 810 is simply used to count the sheets 38 passing photodiode 204. This count, however, is supplied to display driver 822, and hence display 824, by way of drivers 790 to 796, which supply the BCD signals 1, 2, 4 and 8 to driver 822 from counter 810. Counter 810 supplies the BCD equivalent of a particular digit in accordance with the particular digit signal D1, D2, D3 or D4 that is currently at a high level. Counter 810 also supplies these digit signals directly to driver 822 to insure that the BCD inputs are strobed into the driver 822 at the proper time.

Counter 810 maintains a count of the sheets 38 passing photodiode 204 as indicated by the DOCSIG signal on line 496. When the document count equals the desired batch count loaded into counter 810 by actuation of switches 578 to 588, counter 810 supplies a low-level $\overline{EQUAL}$ signal to inverter 826, which thereupon supplies a positive-going pulse to the CLK input of flip-flop 828. If, as is normally the case, the D input to flip-flop 828 is high at this time, flip-flop 828 will change state to provide a low-level $\overline{EQUAL}$ signal on line 852. This signal on line 852 is used to disable the mechanical drive. Since the portion of the electromechanical control circuit responsive to line 852 is conventional, and forms no part of the present invention, it has been omitted from the description for the purposes of simplicity.

Line 852 also supplies a low-level $\overline{EQUAL}$ signal if the stop switch 714 (FIG. 10) is closed to produce a low-level signal on line 744. Flip-flop 828 reset will remain reset if a low-level signal appears on any of lines 702, 742, 744 or 746, or a high-level signal appears on either of lines 674 and 695. Thus, flip-flop 828 will remain reset if none of batch selection switches 578 to 588 (FIG. 10) have been actuated and BATCHOFF line 674 remains, therefore, at a high logic level.

Counter 810 produces periodic pulse trains on lines D1 to D4 at a frequency controlled by capacitance 818. This capacitance, which approximates 1 pF, may be realized either by a discrete element or, if desired, by utilizing the stray capacitance of the printed circuit board containing counter 810. Thus, the required capacitance may be achieved by disposing a matrix of lines under the chip making up counter 810 and using the dielectric constant of the printed circuit board and the solder mask layer to isolate it to give the required capacitance. NOR gate 890 supplies gate 902 with relatively short (e.g., 0.1 millisecond) pulses coincident with the trailing edges of the D2 and D4 signals. Capacitor 894 and resistor 896 at the input to inverter 900 have a time constant of about 0.5 second so that transistor 908 supplies beeper 914 with a pulse train approximating this duration. Capacitance 818 reduces the frequency of pulses D1 to D4 to a value low enough (about 525 Hz, or about one-quarter the resonant frequency of beeper 914) to allow beeper 914 to be excited with a ringing type of signal as described, without being unduly sensitive to the particular instant of excitation.

Counter 810, which generates signals on line D1 to D4 in the sequence D4-D3-D2-D1, sets display flip-flop 858 at the beginning of each D4 pulse and resets the flip-flop through NOR gate 860 at the end of each D2 pulse or sooner if any of the BCD inputs to gates 864 and 866 are high. Flip-flop 858, whenever it is reset, effectively removes buffers 790 to 794 from the BCD inputs to display driver 822, allowing the inputs to be pulled high through resistors 798 to 804. As a result, display 824 blanks the first two leading zeros of the count, while displaying the two least significant digits even if they are zero. Actuation of one of keys 578 to 590 produces a high-level KEYDOWN input to NOR gate 856, setting flip-flop 858 to blank the display 824 while the key is actuated.

If the user has selected remote operation by actuating switch 708, the signal on line 752 to NOR gate 856 will likewise set flip-flop 858, in effect removing buffers 790 to 796 from the circuit. This time, however, low-level outputs from buffers 806 and 808 cause display 824 to display four dashes (----) to indicate remote operation.

Figure 12:
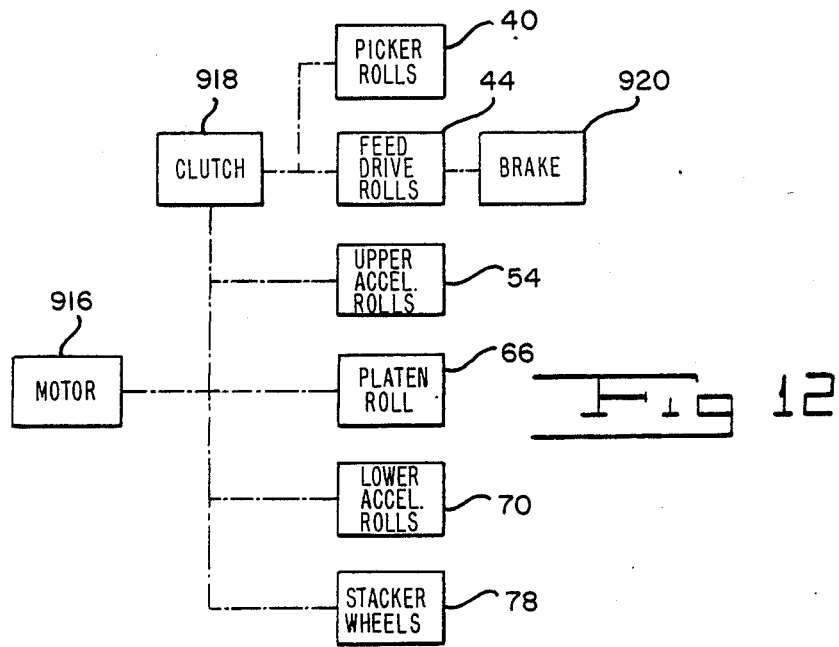
FIG. 12 is a schematic diagram of the drive train of the apparatus shown in FIG. 1.

Referring now to FIG. 12, an electric motor 916 drives upper acceleration rolls 54, platen roll 66, lower acceleration rolls 70 and stacker wheels 78 directly, through suitable coupling elements (not shown), and picker rolls 40 and feed rolls 44 through an electrically actuated clutch 918. Picker rolls 40 and feed drive rolls 44 are also coupled to an electrically actuated brake 920 which, upon actuation, halts rotation of these drive elements. As noted above for upper acceleration rolls 54, feed members 40 and 44 are preferably driven at a first linear velocity for a given motor speed, while feed members 54, 66, 70 and 78 are preferably driven at a second linear velocity in excess of the first velocity to create gaps between successively fed sheets 38.

Figure 13:
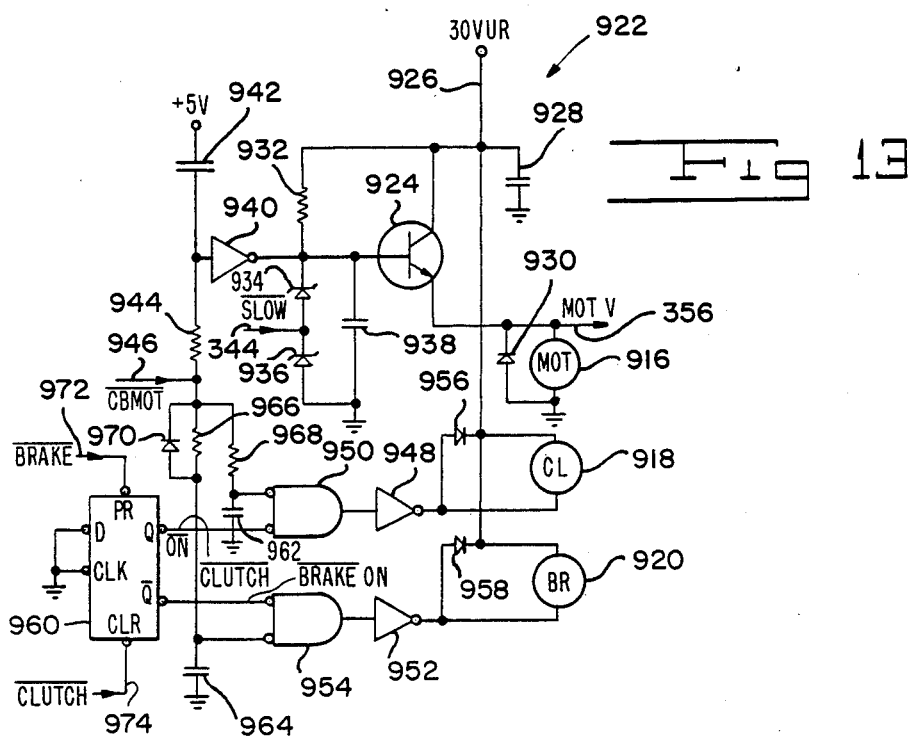
FIG. 13 is a schematic diagram of a portion of the electromechanical control circuit of the apparatus shown in FIG. 1.

Referring now to FIG. 13, motor 916 is coupled between ground and MOTV line 356, which in turn is coupled to the emitter of an NPN Darlington transistor 924. Transistor 924 has its collector coupled to a 30-volt unregulated supply line 926 which is coupled to ground through a capacitor 928. A diode 930 coupled across motor 916 provides a current path for the reverse potential generated when motor 916 is deactuated. Transistor 924 has its base coupled to the 30 volt line 926 through a resistor 932 and to ground through two seriescoupled zener diodes 934 and 936. A capacitor 938 also provides a coupling between the base of transistor 924 and ground. Zener diodes 934 and 936 have their junction coupled to $\overline{\text{SLOW}}$ line 344. Transistor 924 additionally has its base coupled to the output of a logic inverter 940, the input of which is coupled to the 5-volt supply through a capacitor 942 and to a $\overline{\text{CBMOT}}$ line 946 which carries a low-level signal when motor 916 and clutch 918 are to be actuated.

Clutch 918 is coupled between the 30-volt line 926 and the output of an inverting driver 948, the input of which is responsive to a NOR gate 950. Brake 920 is likewise coupled between line 926 and the output of an inverting driver 952, the input of which is coupled to a NOR gate 954. Respective diodes 956 and 958 coupled across clutch 918 and brake 920 function in a manner similar to that of diode 930 to prevent voltage spikes when the devices are deactuated. NOR gates 950 and 954 have inputs coupled to the Q and $\overline{\text{Q}}$ outputs, respectively, of a D-type flip-flop 960. NOR gate 950 has its other input coupled to ground through a capacitor 962 and to line 946 through a resistor 968. Similarly, gate 954 has one input coupled to ground through a capacitor 964 and to line 946 through a resistor 966. A diode 970 coupled across resistor 966 provides a direct path for low level signals on line 946 to NOR gate 954. Flip-flop 960 has its PR and CLR inputs coupled to a $\overline{\text{BRAKE}}$ line 972 and to a $\overline{\text{CLUTCH}}$ line 974, respectively.

As noted above, whenever motor 916 and clutch 918 are to be actuated, a low-level signal appears on line 946. As a result, the output of inverter 940, coupled to the base of transistor 924, is allowed to rise to the potential established by zener diodes 934 and 936. The emitter-follower circuit of transistor 924 transmits this potential to motor 916.

As noted above, if the endorser lever 970 is moved to an engaged position, the endorser sensor circuit 334 generates a low-level $\overline{\text{SLOW}}$ signal on line 344. This signal in effect grounds the anode of zener diode 934, causing the base potential of transistor 924 to drop to the zener potential of diode 936.

Whenever motor 916 is actuated, clutch 918 may also be actuated depending on the state of flip-flop 960. Thus, a low-level signal on line 974 resets flip-flop 960, actuating clutch 918 through NOR gate 950 and driver 948; on the other hand, a low-level signal on line 972 sets flip-flop 960, deactuating clutch 918 even if line 946 remains low and motor 916 remains actuated. Picker rolls 40 and feed rolls 44 are controlled separately from the other drive members of the apparatus 20 to allow their rapid actuation and deactuation in batching operations. To actuate brake 920 a high-level signal is applied to $\overline{\text{CBMOT}}$ line 946 to disable motor 916 and clutch 918, while a low-level $\overline{\text{BRAKE}}$ signal is applied to line 972 to set flip-flop 960. Capacitor 964 remains at a low level for a sufficient period following the appearance of a high-level signal on line 946 for NOR gate 954 to produce a momentary high-level output, momentarily energizing brake 920.

Referring now to FIG. 14, the error condition circuit, indicated generally by the reference numeral 976, includes a D-type flip-flop 980, the D input of which is grounded and the CLK input of which is responsive to an AND gate 978. DOCSIG line 496 (FIG. 7) and $\overline{\text{DBLON}}$ line 758 (FIG. 10) drive two inputs to gate 978, while a third input is derived from a Schmitt trigger inverter 994. Flip-flop 980 is initially reset by the low-level $\overline{\text{CLR ERR}}$ signal generated on line 516 at the beginning of operation and following the clearance of an error condition. If a low-level $\overline{\text{DBL}}$ signal is generated on line 412 by the doubles detection circuit 368 of FIG. 8, flip-flop 980 changes state to supply a high input through a resistor 982 to the base of an NPN transistor 984 having its emitter grounded. Transistor 984 has its collector connected to the cathode of a light-emitting diode (LED) 986, the anode of which is coupled to the 5-volt supply through a resistor 988. LED 986 provides an indication to the user that a double feed has been detected. Preferably, LED 986 and resistor 988 are contained on the same printed circuit board as the display circuit 576 shown in FIGS. 10 and 11.

If flip-flop 754 (FIG. 10) has been set to provide a low-level $\overline{\text{DBLON}}$ signal on line 758, a NOR gate 990 responsive to that signal and to the $\overline{\text{Q}}$ output of flip-flop 980 provides a high-level output to inverter 994. Inverter 994 in turn provides a low-level signal to the PR input of a D-type flip-flop 996. Flip-flop 996, upon being set in this manner, provides a LERR (latched error) signal on line 892. This signal is used to actuate an audible alarm (FIG. 11), as well as to provide a signal to a portion (not shown) of the electromechanical control circuit to disable the mechanical drive. Flip-flop 996, which is initially cleared by the signal on line 516, has its D input coupled to the 5-volt supply and its CLK input coupled to ERR line 434 (FIG. 8). The appearance of a momentary positive-going pulse on line 434 upon the detection of a misfeed sets flip-flop 996 to provide a latched signal on line 892. Flip-flop 996 is reset following the clearance of a misfeed condition by a low-level signal on line 516.

If line 758 is set to carry a high-level signal rather than a low-level signal as described above, then the detection of a double feed will result only in the actuation of LED 986, through flip-flop 980, and will not also set error flip-flop 996. If line 758 is set at such a high logic level, doubles flip-flop 980 is reset as each new document passes photodiode 204 with the coincidence of high-level signals at the inputs to AND gate 978.

In the endorser sensor circuit 334 shown in FIG. 8, the N-S signal generated on line 366 exists at one of two levels, depending on whether endorser module 64 is engaged. In certain applications, it may be desirable to provide a comparison signal for more than two motor speeds, as well as a comparison signal which indicates the actual speed of the motor as distinguished from the desired speed as indicated by the $\overline{SLOW}$ signal on line 344. An alternative form of comparison signal generating circuit, indicated generally by the reference numeral 1000, is shown in FIG. 15. This alternative system, which would replace components 346 to 364 of FIG. 8, includes a tachometer 1002 of any suitable type known to the art, coupled to the shaft 56 supporting acceleration rolls 54. Tachometer 1002 drives a suitable signal-conditioning circuit indicated generally by the reference numeral 1004. Circuit 1004 provides an output signal on N-S line 366 that is proportional to the instantaneous speed of feed rolls 44. If desired, rather than having an output signal that is strictly proportional to the speed of rolls 44, a suitable offset could be provided, or conditioner 1004 could have a suitable nonlinear transfer function to match the characteristic of the RC timing circuits shown in FIG. 8.

It will be seen that I have accomplished the objects of my invention. My apparatus is capable of operating reliably in a document endorsing mode, while at the same time operating at maximum efficiency when the endorser is not in operation. My apparatus reliably detects double feeds even for such difficult-to-distinguish documents as new $5 bills and old $20 bills, and maximizes the use of sensor information in detecting misfeeds. My apparatus does not require frequent replacement of components such as light-emitting diodes and the like, and is operable over a wide range of ambient conditions. My apparatus is also relatively insensitive to changes in transport speeds. Finally, my apparatus is easy to service and is simple and inexpensive.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus including in combination means for advancing a sheet along a path, a sensor disposed along said path, means responsive to said sensor for generating a sheet signal over a test interval during which said sheet is adjacent to said sensor, means for integrating said sheet signal, means for generating a reference signal which varies with changes in the speed of said advancing means occurring in the course of said test interval, and means for comparing the integrated sheet signal with said reference signal.

2. Apparatus as in claim 1 in which said sheet signal indicates the presence of said sheet at a predetermined location along said path.

3. Apparatus as in claim 1 in which said sheet signal indicates the optical density of said sheet at a predetermined location along said path.

4. Apparatus as in claim 1 in which said sheet signal indicates the simultaneous presence of said sheet at a first location along said path and absence at a second location along said path transversely spaced from said first location.

5. Apparatus as in claim 1 in which said comparing means generates an error signal in response to an integrated sheet signal exceeding said reference signal.

6. Apparatus as in claim 1 in which said reference signal means measures the speed of said advancing means.

7. Apparatus as in claim 1 including means for generating a control signal and means for controlling the speed of said advancing means in accordance with said control signal, said reference signal means generating said reference signal in response to said control signal.

8. Apparatus including in combination means for advancing sheets of predetermined optical density along a path, means for generating a signal representing the optical density of a sheet portion passing a predetermined location along said path, an integrator, means for generating a threshold signal representing an optical density greater than said average optical density, means for comparing said optical density signal with said threshold signal to produce a coupling signal when said optical density signal exceeds said threshold signal, and means responsive to said coupling signal for coupling said optical density signal to said integrator only when said optical density signal exceeds said threshold signal.

9. Apparatus as in claim 8 including means for comparing the output of said integrator with a reference signal.

10. Apparatus as in claim 8 including means responsive to said integrator for generating a signal indicating a multiple feed.

11. Apparatus as in claim 8 in which said threshold signal is generated as a function of said optical density signal.

12. Apparatus as in claim 8 in which said threshold signal means includes means for storing a signal representing the value of said optical density signal in the absence of a sheet and means responsive to said storing means for generating said threshold signal.

13. A method of detecting the simultaneous multiple feeding of sheets of predetermined average optical density along a path including the steps of generating a signal representing the optical density of a sheet portion passing a predetermined location along said path, comparing said optical density signal with a threshold signal representing an optical density greater than said average optical density, and integrating said optical density signal only when the optical density represented by said signal exceeds the optical density represented by said threshold signal.

14. A method as in claim 13 including the step of comparing the integrated optical density signal with a reference signal.

15. A method as in claim 14 including the step of generating an error signal in response to an integrated optical density signal exceeding said reference signal.

16. A method as in claim 13 in which said threshold signal is generated as a function of said optical density signal.

17. A method as in claim 13 in which said step of generating said threshold signal includes the steps of storing a signal representing the value of said optical density signal in the absence of a sheet and deriving said threshold signal from said stored signal.

* * * * *